(12) United States Patent
Pensak

(10) Patent No.: US 10,156,247 B2
(45) Date of Patent: Dec. 18, 2018

(54) MAGNETIC SYSTEM FOR JOINING AND FASTENING MATERIALS

(71) Applicant: David Pensak, Wilmington, DE (US)

(72) Inventor: David Pensak, Wilmington, DE (US)

(*) Notice: Subject to any disclaimer, the term of this patent is extended or adjusted under 35 U.S.C. 154(b) by 0 days.

(21) Appl. No.: 15/313,639

(22) PCT Filed: May 26, 2015

(86) PCT No.: PCT/US2015/032410
§ 371 (c)(1),
(2) Date: Nov. 23, 2016

(87) PCT Pub. No.: WO2015/183798
PCT Pub. Date: Dec. 3, 2015

(65) Prior Publication Data
US 2017/0234340 A1  Aug. 17, 2017

Related U.S. Application Data

(60) Provisional application No. 62/003,191, filed on May 27, 2014, provisional application No. 62/106,336, filed on Jan. 22, 2015.

(51) Int. Cl.
| | | |
|---|---|---|
| *B60N 2/58* | (2006.01) | |
| *A44B 18/00* | (2006.01) | |
| *F16B 1/00* | (2006.01) | |
| *A41F 1/00* | (2006.01) | |
| *A45F 5/00* | (2006.01) | |
| *A45F 5/02* | (2006.01) | |
| *F16B 11/00* | (2006.01) | |

(52) U.S. Cl.
CPC .......... *F16B 1/00* (2013.01); *A41F 1/002* (2013.01); *A45F 5/00* (2013.01); *A45F 5/02* (2013.01); *F16B 11/006* (2013.01); *F16B 2001/0035* (2013.01)

(58) Field of Classification Search
CPC ...... A45F 5/00; A45F 5/02; F16B 2001/0035; F16B 11/006; Y10T 24/32; A44D 2203/00; A41F 1/002
See application file for complete search history.

(56) References Cited

U.S. PATENT DOCUMENTS

| | | | |
|---|---|---|---|
| 4,941,236 A * | 7/1990 | Sherman | A44C 5/2071 24/265 WS |
| 5,635,889 A | 6/1997 | Stelter | |
| 8,235,262 B1 | 8/2012 | Sakdol | |
| 2012/0051193 A1 | 3/2012 | Yu | |
| 2013/0108884 A1 | 5/2013 | Lillich | |
| 2014/0130233 A1 | 5/2014 | Horton | |

OTHER PUBLICATIONS

International Search Report and Written Opinion of the International Searching Authority in PCT/US2015/032410, dated Oct. 16, 2015.

* cited by examiner

*Primary Examiner* — Robert Sandy
(74) *Attorney, Agent, or Firm* — Potter Anderson and Corroon LLP

(57) ABSTRACT

A multi-component magnetic system for joining materials together or fastening materials to a person's body is disclosed. The system is particularly useful as a closure or joining mechanism in clothing, accessories and the like.

20 Claims, 10 Drawing Sheets

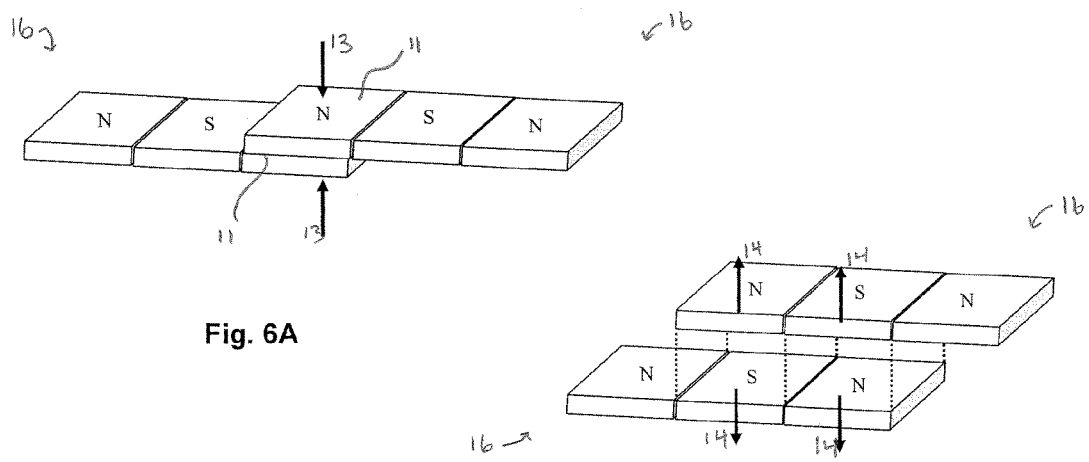
Fig. 6A
Fig. 6B
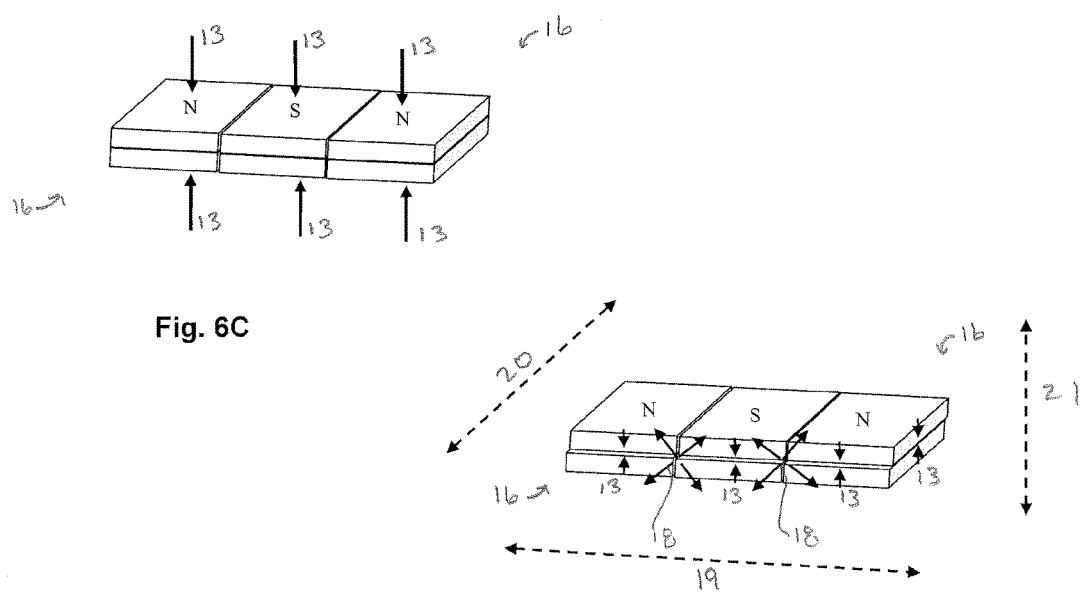
Fig. 6C
Fig. 6D

MAGNETIC SYSTEM FOR JOINING AND FASTENING MATERIALS

This is a U.S. national filing, pursuant to 35 U.S.C. § 371, of International Application No. PCT/US2015/032410, filed May 26, 2015, which claims the benefit of U.S. Provisional Application No. 62/003,191, filed May 27, 2014, and U.S. Provisional Application No. 62/106,336, filed Jan. 22, 2015, the entire contents of each of which are incorporated by reference herein.

FIELD OF THE INVENTION

This invention relates to a closure or fastening mechanism. In particular, the invention provides a multi-component magnetic system for joining materials together. The system is particularly useful as a closure or joining mechanism in clothing, accessories and the like.

BACKGROUND OF THE INVENTION

Articles of clothing and accessories typically contain one or more mechanisms that enable closure or joining of various elements. Common closure mechanisms include zippers, buttons, clasps, snaps, buckle, VELCRO and ties. All of these are useful, but suffer from disadvantages.

For instance, zippers can bind, break or become stuck in surrounding fabric, and can pinch the skin of the wearer. Buttons, snaps, ties, and similar closure mechanisms must be fastened one at a time, and do not provide a continuous seal against the elements. Velcro can become clogged with fabric or hair, and can also cause discomfort by becoming caught in the wearer's hair. Tape can leave adhesive residue on clothes or tear the fabric during removal. Furthermore, none of these mechanisms is self-closing.

By contrast, magnetic fasteners are self-closing, and have been used with some success. For instance, a magnetic button includes a female element having a magnetic core that magnetically attaches to a male element made of metal. However, this type of fastener still does not offer a continuous seal against dirt, rain and other external elements, nor does it offer any way to adjust the fit of an article of clothing or any versatility as to how the article is closed or joined with another article.

Despite the above-discussed deficiencies exhibited by magnetic buttons and the like, the use of magnets in fastening devices still holds promise. Interestingly, magnets have been shown to exhibit unique magnetic properties when assembled together in an array or other similar structure. For example, one such array, developed by Klaus Halbach, demonstrated that aligning cubic or rod-shaped magnets in a linear array in which each magnet of the array was arranged such that its magnetic field was rotated about 90 degrees in relation to its adjacent neighbor produced an array with a one-sided flux. This type of array, which exhibits twice the magnetism on one side and essentially no magnetism on the other side, has been used on refrigerator doors and maglev trains. U.S. Pat. No. 5,635,889 discloses a variation of the Halbach array in which rectangular permanent magnets are arranged in a ring structure around a rectangular gap to establish a magnetic field in the gap. However, these types of arrays are arranged solely to maximize magnetic attraction or repulsion. Using such arrays in a system for closing or joining materials may make it difficult to unjoin articles without breaking or tearing and do not offer much versatility in the way of adjustability.

What is needed is a system for closing or joining materials or articles that is simple yet versatile, enabling adjustable self closing or joining of articles in a wide variety of modes and combinations. In addition, what is needed is a system that can exploit the magnetic field properties of magnetic arrays to enable versatility and adjustability in self closing or fastening mechanisms for joining articles.

SUMMARY OF THE INVENTION

One aspect of the invention features a system for joining two or more articles, comprising at least one attraction layer comprising magnetic material, and at least one attachment layer comprising material that is magnetically attracted to magnetic material, wherein the attachment layer or the attraction layer, or both, are affixed to one or more of the articles, wherein increasing proximity of the attraction layer to the attachment layer causes joining of the articles. In certain embodiments, an attraction layer is affixed to one article and an attachment layer is affixed to another article, wherein joining is achieved by placing the attraction layer in joinable proximity to the attachment layer. In other embodiments, an attachment layer is affixed to each article to be joined, and joining is achieved by placing each attachment layer in joinable proximity to an attraction layer that is not affixed to the articles, such that the attraction layer is sandwiched between the attachment layers, thereby joining the articles.

In certain embodiments, the articles to be joined are of the same type. In particular, the articles are of a type that includes materials used in clothing or accessories. The system can be incorporated into a single article of clothing, or it can be incorporated into two or more articles of clothing, thereby allowing the articles of clothing to be joined to one another. In other embodiments, the articles to be joined are of different types. For instance, one article can be material used in clothing or accessories and another article can be skin or hair of a body.

In certain types of the system, the pull force between the attraction layer and the attachment layer is at least one pound. The system may include an intensification layer oriented in relation to the attraction layer to increase the force of attraction between the attraction layer and the attachment layer. When an intensification layer is used, the pull force between the attraction layer and the attachment layer is at least three times the force achieved in the absence of the intensification layer. In some embodiments, the material comprising the intensification layer is the same as the material comprising the attachment layer, while in other embodiments, the material comprising the intensification layer is different from the material comprising the attachment layer.

The above-described system may also include two or more attraction layers. In some instances, the attraction layers are positioned with opposite poles facing each other, so that the attraction layers attract each other. In other instances, the attraction layers are positioned with the same poles facing each other, so that the attraction layers repel each other.

Another aspect of the invention features a system for joining two or more articles, comprising a first attraction layer comprising magnetic material, and a second attraction layer, wherein the first attraction layer or the second attraction layer, or both, are affixed to one or more of the articles, wherein increasing proximity of the first attraction layer to the second attraction layer causes joining of the articles. In certain embodiments, each of the first attraction layer and the second attraction layer comprises a plurality of magnetic members. In other embodiments each magnetic member is a planar magnetic member comprising a magnetic field having a magnetic orientation.

In certain embodiments, each planar magnetic member is coupled to at least one other planar magnetic member in an array, wherein the array comprises a first dimension, and wherein the magnetic orientation of each planar magnetic member is rotated about 160 degrees to about 200 degrees in relation to the magnetic orientation of each planar member to which it is coupled in the first dimension. Additionally, the array may further comprise a second dimension comprising planar magnetic members, wherein each planar magnetic member in the second dimension is coupled to at least one other planar magnetic member in the first dimension and to at least one other planar magnetic member in the second dimension. In this embodiment, the magnetic orientation of each planar magnetic member in the second dimension is rotated about 160 degrees to about 200 degrees in relation to the magnetic orientation of each planar magnetic member to which it is coupled in the first dimension and the magnetic orientation of each planar member in the second dimension is substantially the same as the magnetic orientation of each planar magnetic member to which it is coupled in the second dimension. In some embodiments, the coupling comprises an adhesive material, wherein the adhesive material is not a magnet-attracted material. Alternatively, the array comprises an elastomeric material in between planar magnetic members that are coupled.

In certain embodiments, the first attraction layer is affixed to one article and the second attraction layer is affixed to another article, wherein joining is achieved by placing the first attraction layer in joinable proximity to the second attraction layer, such that the planar magnetic members of the first attraction layer and the planar magnetic members of the second attraction layer are each positioned with opposite magnetic poles facing each other, whereby sliding of the first attraction layer along a lateral axis of the second attraction layer is reduced in the first dimension.

In an alternative embodiment, each planar magnetic member is coupled to at least two other planar magnetic members in an array, wherein the array comprises a first dimension and a second dimension, and wherein the magnetic orientation of each planar magnetic member is rotated about 160 degrees to about 200 degrees in relation to the magnetic orientation of each planar magnetic member to which it is coupled in both the first dimension and the second dimension. In some embodiments, the coupling comprises an adhesive material, wherein the adhesive material is not a magnet-attracted material. In other embodiments, this array comprises an elastomeric material in between planar magnetic members that are coupled.

In certain embodiments, the first attraction layer is affixed to one article and the second attraction layer is affixed to another article, wherein joining is achieved by placing the first attraction layer in joinable proximity to the second attraction layer, such that planar magnetic members of the first attraction layer and the planar magnetic members of the second attraction layer are each positioned with opposite magnetic poles facing each other, whereby sliding of the first attraction layer along the lateral axis of the second attraction layer is reduced in both the first dimension and the second dimension.

In certain types of the system, the first attraction layer is affixed to one article and the second attraction layer is affixed to another article, wherein the planar magnetic members of the first attraction layer and the planar magnetic members of the second attraction layer are each positioned with the same magnetic poles facing each other, so that the first attraction layer and the second attraction layer repel each other.

In certain embodiments, the articles to be joined are of the same type. In particular, the articles are of a type that includes materials used in clothing or accessories. The system can be incorporated into a single article of clothing, or it can be incorporated into two or more articles of clothing, thereby allowing the articles of clothing to be joined to one another. In other embodiments, the articles to be joined are of different types. For instance, one article can be material used in clothing or accessories and another article can be skin or hair of a body. In certain types of the system, the pull force between the attraction layer and the attachment layer is at least one pound.

Still another aspect of the invention features a magnetic array comprising a plurality of planar magnetic members, wherein each planar magnetic member comprises a magnetic field having a magnetic orientation, wherein each planar magnetic member is coupled to at least one other planar magnetic member in a first dimension and wherein the magnetic orientation of each planar magnetic member is rotated about 160 degrees to about 200 degrees in relation to the magnetic orientation of each planar member to which it is coupled in the first dimension.

In certain embodiments, this magnetic array further comprises a second dimension comprising planar magnetic members, wherein each planar magnetic member in the second dimension is coupled to at least one other planar magnetic member in the first dimension and to at least one other planar magnetic member in the second dimension. In this type of array, the magnetic orientation of each planar magnetic member in the second dimension is rotated about 160 degrees to about 200 degrees in relation to the magnetic orientation of each planar magnetic member to which it is coupled in the first dimension, but the magnetic orientation of each planar member in the second dimension is substantially the same as the magnetic orientation of each planar magnetic member to which it is coupled in the second dimension.

In yet other embodiments, the magnetic array further comprises a second dimension comprising planar magnetic members, wherein each planar magnetic member in the second dimension is coupled to at least one other planar magnetic member in the first dimension and to at least one other planar magnetic member in the second dimension, wherein the magnetic orientation of each planar magnetic member in the second dimension is rotated about 160 degrees to about 200 degrees in relation to the magnetic orientation of each planar magnetic member to which it is coupled in the first dimension, and wherein the magnetic orientation of each planar member in the second dimension is rotated about 160 degrees to about 200 degrees in relation to the magnetic orientation of each planar magnetic member to which it is coupled in the second dimension.

In certain types of the magnetic array, the coupling comprises an adhesive material, wherein the adhesive material is not a magnet-attracted material. In yet other types, the magnetic array further comprising an elastomeric material in between planar magnetic members that are coupled.

Other features and advantages of the present invention will be understood by reference to the drawings and detailed description that follow.

BRIEF DESCRIPTION OF THE DRAWINGS

FIG. 1: Top views of embodiments of the invention.

FIG. 2: Side views of embodiments of the invention.

FIG. 3: Side views of additional embodiments of the invention.

FIG. 4: Side and perspective view of additional embodiments of the invention. FIG. 4B, on the right, shows two planar magnetic members within joinable proximity of each other, with the magnetic south pole (S) and magnetic south pole (S) indicated, such that the two planar magnetic members will be repelled from one another. Arrows indicate the repulsion force between the planar magnetic members.

FIG. 5: Perspective views of additional embodiments of the invention.

FIG. 6: Perspective views of additional embodiments of the invention. FIG. 6A depicts one-dimensional alternating magnetic field arrays magnetically attached to each other. Arrows indicate the pull force between the one-dimensional alternating magnetic field arrays. FIG. 6B depicts one-dimensional alternating magnetic field arrays being repelled from one another. Arrows indicate the repulsive force between the one-dimensional alternating magnetic field arrays. FIG. 6C depicts one-dimensional alternating magnetic field arrays magnetically attached to each other. Arrows indicate the pull force between the one-dimensional alternating magnetic field arrays. FIG. 6D depicts one-dimensional alternating magnetic field arrays magnetically attached to one another, which prevents lateral slipping or sliding in one dimension.

FIG. 7: Perspective views of additional embodiments of the invention.

FIG. 8: Perspective views of additional embodiments of the invention.

FIG. 9: Top view of additional embodiments of the invention.

DETAILED DESCRIPTION OF ILLUSTRATIVE EMBODIMENTS

Definitions

Figure 1A:
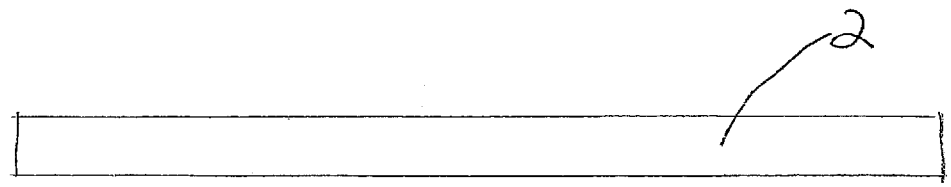
FIG. 1A shows an attachment layer depicted as a flexible strip comprising a metal that is attracted to the attraction layer.

Ranges are used herein as shorthand to avoid having to list and describe each and every value within the range. Any appropriate value within the range can be selected, where appropriate, as the upper value, lower value, or the terminus of the range.

As used herein, the singular form of a word includes the plural, and vice versa, unless the context clearly dictates otherwise. Thus, the references "a", "an", and "the" are generally inclusive of the plurals of the respective terms. For example, reference to "a material" or "an article" includes a plurality of such "materials" or "articles." Similarly, the words "comprise", "comprises", and "comprising" are to be interpreted inclusively rather than exclusively. Likewise the terms "include", "including" and "or" should all be construed to be inclusive, unless such a construction is clearly prohibited from the context. Similarly, the term "examples," particularly when followed by a listing of terms, is merely exemplary and illustrative and should not be deemed to be exclusive or comprehensive.

The term "comprising" is intended to include embodiments encompassed by the terms "consisting essentially of" and "consisting of". Similarly, the term "consisting essentially of" is intended to include embodiments encompassed by the term "consisting of".

The methods and compositions and other advances disclosed herein are not limited to particular methodologies, protocols, and materials because, as the skilled artisan will appreciate, they may vary. Further, the terminology used herein is for the purpose of describing particular embodiments only, and is not intended to, and does not, limit the scope of that which is disclosed or claimed.

Unless defined otherwise, all technical and scientific terms, terms of art, and acronyms used herein have the meanings commonly understood by one of ordinary skill in the art in the field(s) of the invention, or in the field(s) where the term is used. Although any compositions, methods, articles of manufacture, or other means or materials similar or equivalent to those described herein can be used in the practice of the invention, the preferred compositions, methods, articles of manufacture, or other means or materials are described herein.

As used herein, the term "about" modifying the angle of rotation of a magnetic member or the magnetic field of that magnetic member refers to the variation in the numerical value of the recited angle due to typical error rates of the device used to measure the angle of the magnetic field orientation. The term "about" also encompasses slight variations in the position of magnetic member that would alter the orientation of the magnetic field as well as slight variations and fluctuations in the magnetic field of any particular magnetic member due to the influence of a neighboring magnetic field or the like. In one embodiment, the term "about" means within 10% of the reported numerical value, preferably within 5% of the reported numerical value.

The term "attachment layer" means that the layer contains one or more materials that are attracted to magnets.

The term "attachment surface" is used interchangeably with "attachment area" and means the surface area between the attraction layer and the attachment layer.

The term "attraction layer" means that the layer contains a magnetic material, or a combination of magnetic materials, which can be any ferromagnetic or ferrimagnetic material that can be made into a permanent magnet. In addition, the term "attraction layer" encompasses a layer that contains a magnetic array with an alternating magnetic field in one or more dimensions, such as a one-dimensional alternating magnetic field array or a two-dimensional alternating magnetic field array as described herein.

The term "joinable proximity" means the proximity at which the magnetic pull of the attachment layer to the attraction layer, the magnetic pull between two attraction layers, or any combination thereof, is sufficient to achieve joining of the layers. It is sometimes also used to describe the proximity at which the magnetic repulsive forces are sufficient to repel the layers.

As used herein, the term "longitudinal axis" of a magnetic member means the axis perpendicular to a lateral surface of the magnetic member. When the term "longitudinal axis" is used to describe a magnetic field orientation of a magnetic body or material, one skilled in the art will appreciate that such a description is a generalization only and is not meant to be an exact description of the natural flow and fluctuations of the magnetic field produced by the magnetic body or material.

The term "magnet-attracted material" is sometimes uses interchangeably with "ferromagnetic" or "ferrimagnetic materials" and means any material that is attracted to magnets.

The term "non-magnet-attracted material" means any material that is not attracted to magnets.

The term "one-dimensional alternating magnetic field array" means an array in which the magnetic members that comprise the array each have a magnetic field that is rotated in relation to each adjacent magnetic member in the array in one dimension such that the rotation is sufficient to produce an alternating magnetic field in this dimension.

The term "substantially" used herein to describe a magnetic field orientation of a magnetic member or magnetic material that is in "substantially" the same orientation of the magnetic field of another magnetic member of material refers to the variation in the magnetic field due to typical error rates of the device used to measure the angle of the magnetic field orientation. The term "substantially" also encompasses slight variations in the position of magnetic member that would alter the orientation of the magnetic field as well as slight variations and fluctuations in the magnetic field of any particular magnetic member due to the influence of a neighboring magnetic field or the like. In one embodiment, the term "substantially" refers to the magnetic fields of two or more magnetic members that differ in an angle of rotation by less than 10 degrees, preferably less than 5 degrees.

The term "two-dimensional alternating magnetic field array" means an array in which the magnetic members that comprise the array each have a magnetic field that is rotated in relation to each adjacent magnetic member in the array in two dimensions such that the rotation is sufficient to produce an alternating magnetic field in both dimensions.

All patents, patent applications, publications, technical and/or scholarly articles, and other references cited or referred to herein are in their entirety incorporated herein by reference to the extent allowed by law. The discussion of those references is intended merely to summarize the assertions made therein. No admission is made that any such patents, patent applications, publications or references, or any portion thereof, are relevant, material, or prior art. The right to challenge the accuracy and pertinence of any assertion of such patents, patent applications, publications, and other references as relevant, material, or prior art is specifically reserved.

Description:

In its various aspects, the invention features a magnetic system for joining materials or articles together. The system is remarkably versatile and can be used with a wide variety of materials. In preferred embodiments, the system is used to join somewhat flexible materials, such as fabric (of any composition), leather, rubber, vinyl or other flexible polymeric material. In some embodiments, the materials are included in articles of clothing or accessories, including but not limited to outerwear such as coats, jackets, capes, wraps, ponchos, scarves, hats, gloves, boots and the like, garments such as tops, shirts, blouses, dresses, skirts, slacks, shorts, swimwear, robes, cover-ups and the like, undergarments such as brassieres, slips, camisoles, underwear, sleepwear, socks, stockings and the like, and accessories such as purses, backpacks, valises, briefcases, tote bags, belts, shoes, scarves, jewelry and the like. In some embodiments, the system is used to join such materials to the body of the wearer; e.g., garment straps or edges to the skin of the wearer, or an accessory to the hair of the wearer. In other embodiments, the system is used to position one or more portions of the wearer's body within an article of clothing, e.g., fingers within gloves or feet within shoes, as described in greater detail herein. In other embodiments, the system is used to join other articles, such as wood, metal, plastics and ceramics.

The system comprises at least one attraction layer, preferably two or more attraction layers. Alternatively, the system comprises one or more attraction layers, one or more attachment layers and, optionally, one or more intensification layers.

Figure 1B:
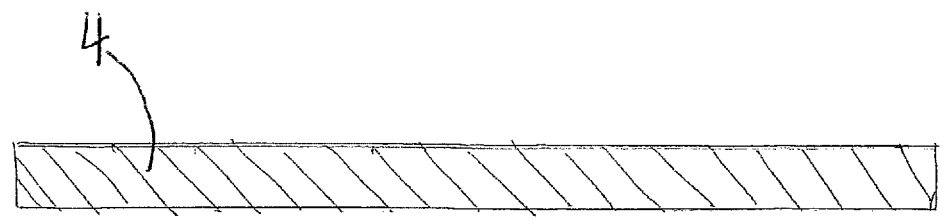
FIG. 1B shows an attraction layer depicted as a flexible magnetic strip.
Figure 1C:
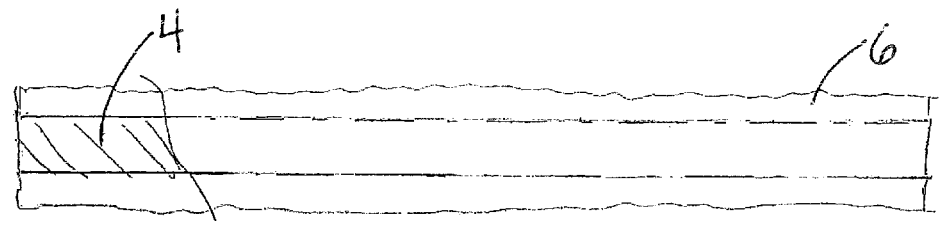
FIG. 1C shows an attraction layer such as the strip shown in FIG. 1B, affixed between two pieces of fabric.
Figure 1D:
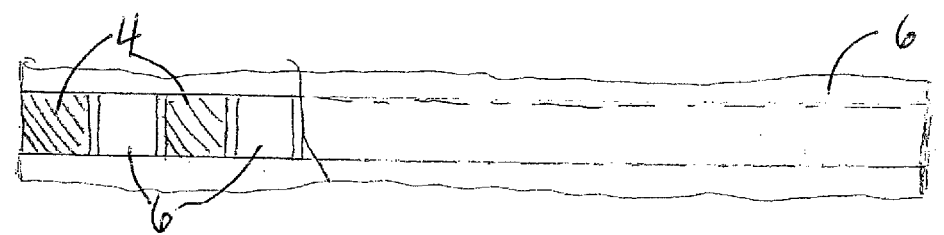
FIG. 1D shows an attraction layer comprising discrete magnetic areas (hatched) affixed at intervals between two pieces of fabric.
Figure 4A:
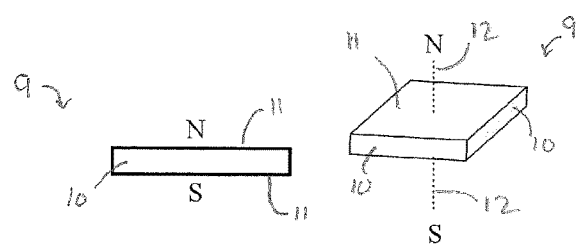
FIG. 4A shows a side view of a planar magnetic member (on the left) and perspective view of a planar magnetic member depicting a magnetic field that is oriented along the longitudinal axis of the planar magnetic member (on the right).
Figure 7A:
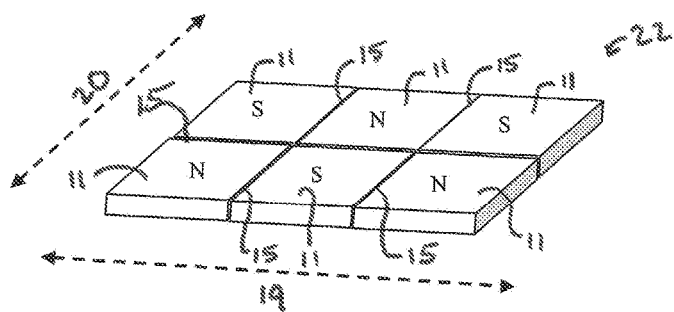
FIG. 7A depicts a perspective view of a two-dimensional alternating magnetic field array.

The attraction layer contains a magnetic material, or a combination of magnetic materials, which can be any ferromagnetic or ferrimagnetic material (e.g., iron, nickel, cobalt, some alloys of rare earth metals) that can be made into a permanent magnet. Nonlimiting examples of suitable magnetic materials are: (1) ceramic (also referred to as ferrite), composed of a sintered composite of powdered iron oxide and barium/strontium carbonate ceramic; (2) alnico, made casting or sintering aluminium, nickel and cobalt with iron and, optionally, small amounts of other elements; and (3) alloys of rare earth (lanthanoid) elements, such as samarium-cobalt or neodymium-iron-boron (NIB) alloys. Also suitable for various embodiments of the present invention are: (4) injection-molded magnets, which are composites of resins and magnetic powders and resemble plastics in their physical properties; and (5) flexible magnets comprising magnetic powders and flexible resins (e.g., vinyl), which can be produced in flat strips, shapes or sheets. An embodiment such as this is shown in FIGS. 1B and 1C, depicting a flexible magnetic strip (4), either unsheathed (FIG. 1B) or disposed between two strips of fabric (6) (FIG. 1C). FIG. 1D depicts another embodiment in which small, magnetic squares (4) are affixed between two strips of fabric (6). Also suitable for various preferred embodiments of the present invention, the magnets or magnetic materials can be assembled in an array having an alternating magnetic field in at least one dimension (FIG. 4D, FIG. 4E, and FIG. 7A). Embodiments such as these are described in greater detail herein.

The attraction layer is designed to be capable of remaining magnetic within normal temperature ranges, as well as at more extreme temperatures. Thus, in certain embodiments, the magnetic material is operable within a temperature range of −40° C. to 50° C. (−40° F. to 122° F.). In other embodiments, the magnetic material is operable at lower temperatures, such as below −50° C., −60° C., −70° C., −80° C., −90° C. or −100° C. In other embodiments the magnetic material is operable at higher temperatures, such as above 60° C., 70° C., 80° C., 90° C., 100° C., 110° C., 120° C. or 130° C. As used herein with respect to magnetism, the term "operable" means that the magnet retains sufficient magnetic capability to function within the magnetic closure/joining system described herein. Typically, a magnet is deemed "operable" up to its maximum operating temperature, which is the temperature below which any observed loss in magnetism is reversible by lowering the temperature. Above that temperature, losses in magnetism become increasingly irreversible, and completely irreversible at or above the Curie temperature ($T_c$), i.e., the temperature at which a ferromagnetic or a ferrimagnetic material becomes paramagnetic.

The attraction layer can be of any shape or size, such as a square, rectangle, triangle, disc, or strip, or it can be an irregular shape. The magnetic material can be disposed throughout the attraction layer substantially continuously, or it can be placed in discrete locations within the attraction layer. In some embodiments more fully described below, the attraction layer may comprise a flexible magnet, such as a flexible strip or patch, without need for further modification. In other embodiments, the attraction layer contains the magnetic material enclosed within or sandwiched between layers of other material, such as fabric or polymeric material, to hold the magnetic material in place and to facilitate incorporation of the attraction layer into the article(s) desired to be joined. In certain embodiments, the attraction layer is a strip of varying length, containing alternating magnets and spacer areas. In certain embodiments, the magnetic material is contained within water repellent or water resistant material.

The attraction layer can be of any suitable thickness. In certain embodiments, the layer is 0.1 inch thick or less. In other embodiments, the layer is 0.09, 0.08, 0.07, 0.06, 0.05, 0.04, 0.03, 0.02 or 0.01 inches thick, or less. In one embodiment, the layer is 0.02-0.04 inches thick, preferably 0.03 inches thick.

The attraction layer may also be composed of multiple magnets of varying sizes and shapes in which the magnets are aligned in close proximity to each other in an array. If each individual magnet is touching another magnet, maximal attraction or repulsion of the array can be achieved due, in part, to the amplification of the magnetic fields of the individual magnets. In some embodiments, however, the individual magnets are rotated or arranged in such a way to alter the magnetic characteristics of the attraction layer. A magnet may be composed of one or more of the magnetic materials discussed above and may have a particular magnetic orientation so that different ends of the magnet will have opposing magnetic poles. In some cases, opposite ends of a magnet will have opposing magnetic poles, depicted herein as a magnetic north pole (N) and a magnetic south pole (S). The magnet can be of any shape, including a square, rod, horseshoe, and the like. In one non-limiting example, magnets of roughly the same shape and size can be arranged in a magnetic array.

In one type of magnetic array, each magnet member of the array can be aligned in a linear arrangement so that its magnetic orientation is rotated about 90 degrees in relation to its adjacent neighbor. If this sequential 90 degree rotation is performed for each magnet in the array, the overall magnetic field of the array will produce a one-sided flux, with twice the magnetism on one side of the array and essentially no magnetism on the other side of the array. However, using an attraction layer with such an array may make it difficult to unjoin the articles or result in tearing of fabrics and other difficulties. In addition, even with increased magnetic pulling force, an attraction layer using these arrays may still slip or slide laterally across the attachment layer or a second attraction layer thereby preventing the user from maintaining the desired position or arrangement of the articles. It is therefore an object of the present invention to utilize arrays with magnetic properties suitable for adjustability and/or versatility.

It has been discovered that assembling a magnetic array in which the magnets are rotated about 160 degrees to about 200 degrees in relation to the adjacent magnet will create an oscillating or alternating magnetic field along the length of the array. Thus, when two such arrays are magnetically attached to each other, the alternating magnetic pulling and repulsive forces significantly reduces lateral sliding between the two arrays. Furthermore, this alternating magnetic field can also reduce lateral sliding between one such array and another material that is magnet-attracted material. If the array is designed with an alternating magnetic field in one direction or dimension, lateral sliding will be reduced in that direction or dimension. Such an array is sometimes referred to herein as a "one-dimensional alternating magnetic field array." Nonlimiting examples of one-dimensional alternating magnetic field arrays are shown in FIG. 4D and FIG. 4E. Further, if the array is designed with an alternating magnetic field in two directions or dimensions, lateral sliding will be reduced in both directions or dimensions. Such an array is sometimes referred to herein as a "two-dimensional alternating magnetic field array." A nonlimiting example of a two-dimensional alternating magnetic field array is shown in FIG. 7A. In certain embodiments, one or more magnets in the array are directly contacting one or more adjacent magnets in the array. In other embodiments, the magnets in the array are separated from each other by a flexible elastomeric material to add significant flexibility to the attraction layer containing the array.

In certain embodiments, at least one attraction layer is composed of an array in which each magnet of the array is rotated about 140, 150, 160, 170, 180, 190, 200, 210, or 220 degrees in relation to the adjacent magnet in at least one dimension, preferably between about 160 degrees and about 200 degrees, more preferably between about 170 degrees and about 190 degrees, most preferably about 180 degrees. Thus, the angle of rotation that is used depends upon the desired magnetic characteristics of the array. For example, if an array exhibiting a one-sided magnetic flux is desires, each magnet of the array is rotated about 80 degrees to about 100 degrees in relation to the adjacent magnet in the array. In other embodiments, the rotation angle of each magnet is about 40, 50, 60, 70, 80, 90, 100, 110, 120, 130, 140, 150, 160, 170, 180, 190, 200, 210, 220, 230, 240, 250, 260, or 270 degrees in relation to the adjacent magnet in either the clockwise or counterclockwise direction. The rotation angles for each magnet may vary or they may be the same.

In certain aspects, the invention utilizes an attachment layer. The attachment layer contains one or more materials that are attracted to magnets, sometimes referred to as ferromagnetic or ferrimagnetic materials, and referred to collectively herein as magnet-attracted materials. Nonlimiting examples of suitable magnet-attracted materials are chromium(IV) oxide, cobalt, dysprosium, ferrite, gadolinium, gallium manganese arsenide, iron, magnetite, neodymium/iron/boron alloy, nickel, permalloy (nickel-iron magnetic alloy), samarium/cobalt alloy, suessite, yttrium iron garnet, and appropriate combinations thereof. In certain embodiments, one or more magnet-attracted materials are incorporated into a flexible material, such as rubber or a flexible polymer, which can be made into suitable strips, shapes or sheets. One example of suitable material for an attachment layer is commercially available, finely powdered iron disposed within a rubber matrix via an adhesive. An example of this material is depicted in FIG. 1A, which shows a flexible metal-containing strip (2).

Like the attraction layer, the attachment layer can be of any shape or size, such as a square, rectangle, triangle, disc, or strip, or it can be an irregular shape. In certain embodiments, the attraction layer is of substantially the same size and shape as a counterpart attachment layer, to facilitate joining of two materials or articles in a desired manner.

The magnet-attracted material can be disposed throughout the attachment layer substantially continuously, or it can be placed in discrete locations within the attachment layer. In certain embodiments, the attachment layer contains the magnet-attracted material enclosed within or sandwiched between layers of other material, such as fabric or polymeric material, to hold the magnet-attracted material in place and to facilitate incorporation of the attachment layer into the article(s) desired to be joined. In certain embodiments, the magnet-attracted material is contained within water repellent or water resistant material. Preferably, the entire attachment layer is washable by hand or machine, or is dry-cleanable, or both.

Figure 2A:
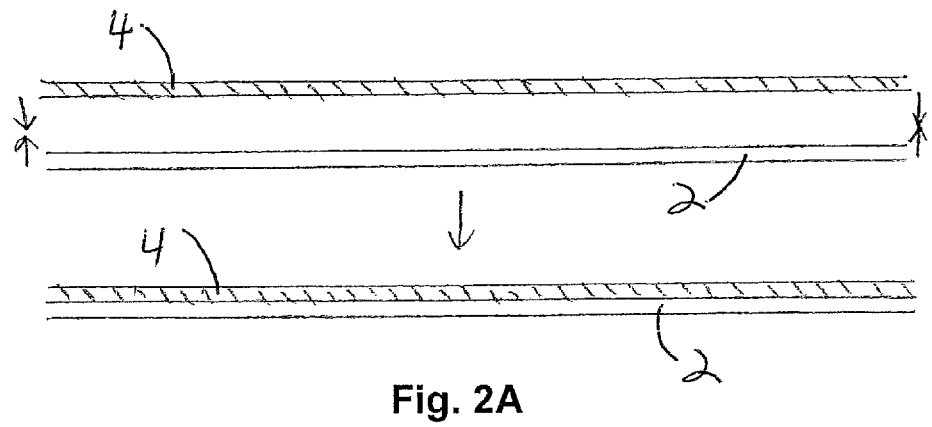
FIG. 2A shows an attraction layer (hatched) within joinable proximity of an attachment layer (unmarked). Arrows indicate the pull force between the attraction layer and the attachment layer. Also shown are the two layers together.
Figure 2B:
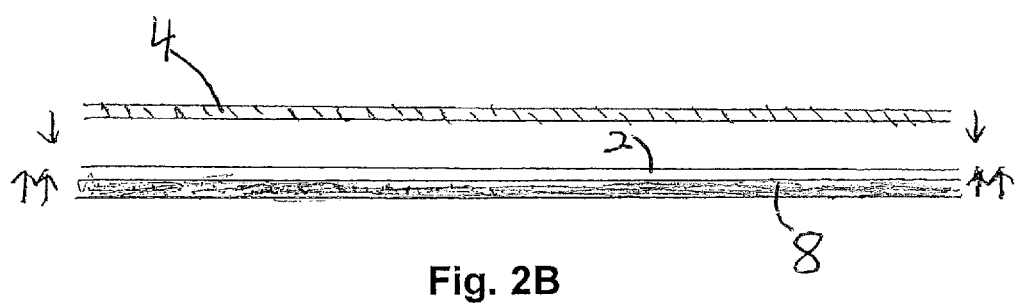
FIG. 2B shows an attraction layer (hatched) within joinable proximity of an attachment layer (unmarked) and an intensification layer (shaded). Arrows indicate the pull force between the attraction layer and the attachment layer, with the double arrow indicating additional pull force provided by the intensification layer. The three layers together are not shown.
Figure 2C:
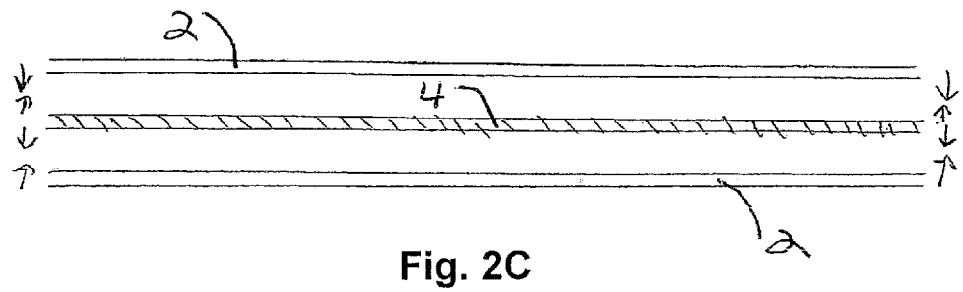
FIG. 2C shows an attraction layer (hatched) within joinable proximity of two attachment layers (unmarked) on either side. Arrows indicate the pull force between the attraction layer and the attachment layers. The three layers together are not shown.

Examples of attachment layers and attraction layers are depicted in FIG. 2. FIG. 2A shows an attraction layer (4) in joinable proximity to an attachment layer (2) (upper portion of the figure) and then actually joined to one another (lower portion of the figure). FIG. 2C shows an attraction layer (4) between two attachment layers (2), each in joinable proximity to the attraction layer.

The optional intensification layer is also composed of one or more magnet-attracted materials, which may be the same as, or different from the materials used in the attachment layer. The overall construction of the intensification layer can also be the same as, or different from, that of the attachment layer. For example, the attachment layer and the intensification layer may both be composed of the same material, may both be the same size and shape, and may both be enclosed within or sandwiched between the same type of fabric or material. Or, one or more of those elements may differ between the attachment layer and the intensification layer. The intensification layer also can be of a different size than the attachment layer, e.g., it may be wider and/or longer than the attachment layer. Preferably, the intensification layer is washable by hand or machine, or is dry-cleanable, or both.

The intensification layer is characterized more by its function than its composition—it serves to constrain the magnetic field coming out the "back side" of the attraction layer, thereby increasing the force of attraction between the attachment layer and the attraction layer. This is depicted in FIG. 2B, which shows an example of an attachment layer (4), attraction layer (2) and intensification layer (8) in appropriate orientation.

The attachment layer and/or the optional intensification layer can be of any suitable thickness. In certain embodiments, one or both of the layers are 0.1 inch thick or less. In other embodiments, the layers are 0.09, 0.08, 0.07, 0.06, 0.05, 0.04, 0.03, 0.02 or 0.01 inches thick, or less. In one embodiment, the layers are 0.02-0.04 inches thick, preferably 0.03 inches thick. Thus, in one exemplary embodiment, the system comprises an the attachment layer and an intensification layer each approximately 0.035 inches thick, and an attraction layer approximately 0.040 inches thick.

The pull force between the attachment layer and the attraction layer should be in excess of about one pound (i.e., the amount of force required to pull the attraction layer away from the attachment layer). In certain embodiments, it is greater than about 2, 2.5, 3, 3.5, 4, 4.5 or 5 pounds. In other embodiments, it can be greater than 6, 7, 8, 9 or 10 pounds. In other embodiments, it can be greater than 15, 20, 25, 30, 35, 40 or 50 pounds. As a practical matter, the pull force should be sufficient to enable the layers to perform their function as described herein, but not so great to delaminate the layers or tear the garments or other materials on which they are used. Pull force is governed by the magnetic strength of the magnetic material and the surface area between the attraction layer and the attachment layer (sometimes referred to herein as the "attachment surface" or "attachment area") and optional intensification layer.

As mentioned above, the pull force of the system can be increased by adding an intensification layer. In certain embodiments, addition of the intensification layer increases the pull force at least about two-fold as compared with the same system absent the intensification layer. In a preferred embodiment, the pull force is increased at least about three fold when the intensification layer is added.

Figure 3A:
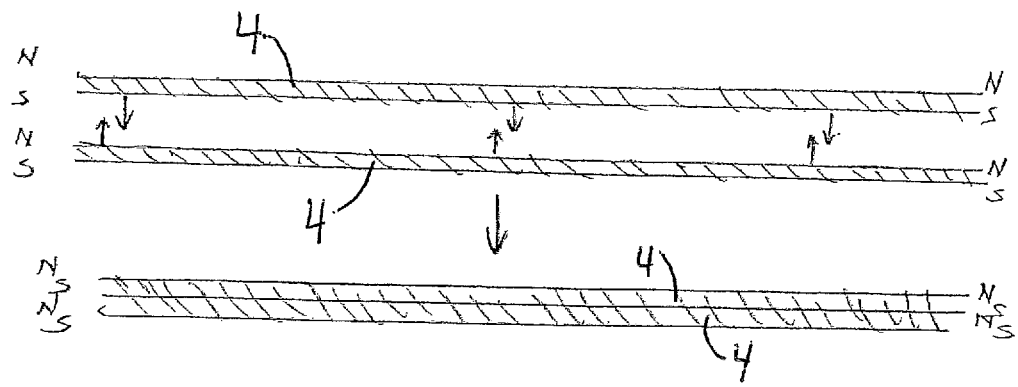
FIG. 3A shows two magnetic attraction layers (hatched) within joinable proximity of each other, with the magnetic north pole (N) and magnetic south pole (S) indicated, such that the two layers will be attracted to one another. Arrows indicate the pull force between the attraction layers. Also shown are the two layers together.
Figure 3B:
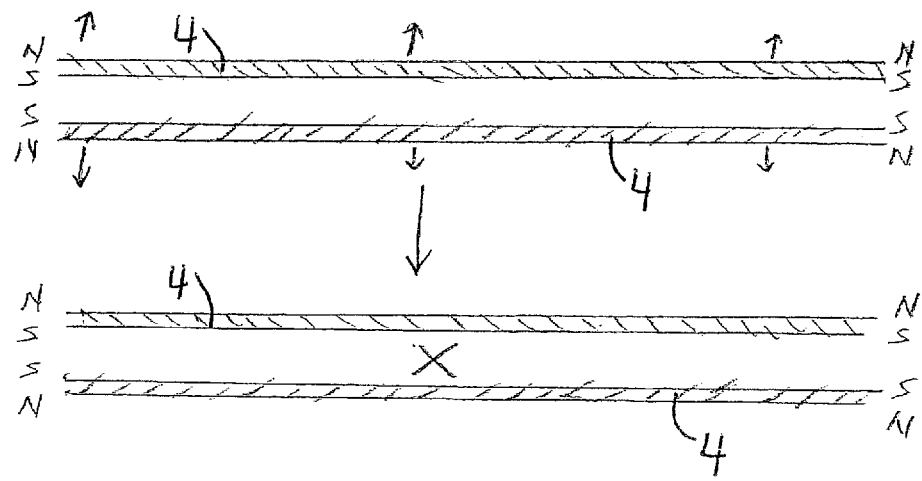
FIG. 3B shows two magnetic attraction layers (hatched) within joinable proximity of each other, with the magnetic north pole (N) and magnetic south pole (S) indicated, such that the two layers will be repelled from one another. Arrows indicate the repulsion force repelling the layers from each other. Also shown are the two layers remaining apart, with the "X" indicating that repulsive forces keep the layers from coming together.

In certain embodiments, two or more attraction layers can be used together. In one such embodiment, the attraction layers are oriented in aligned polarity to increase the pulling force. In another embodiment, the attraction layers are oriented in opposing polarity to create a repulsive force. These orientations are depicted in FIG. 3A and FIG. 3B, respectively.

In certain aspects of the invention, at least one attraction layer can be composed of an alternating magnetic field array. In such embodiments, the attraction layer composed of an alternating magnetic field array can be used in combination with the attachment layer and optional intensification layer as described above. In other embodiments, two or more attraction layers composed of alternating magnetic field arrays can be used together. As discussed in further detail below, these arrays comprise magnetic members arranged in such a way so that the array itself will have a magnetic field that oscillates or alternates in either one-dimension or two-dimensions. In one such embodiment, each attraction layer is composed of multiple magnetic members coupled to one another in at least one dimension, preferably in two dimensions. The magnetic members can be composed of any magnetic material or combination of magnetic materials, which can be any ferromagnetic or ferromagnetic material (e.g., iron, nickel, cobalt, some alloys of rare earth metals) that can be made into a permanent magnet. Nonlimiting examples of suitable magnetic metals are: (1) ceramic (also referred to as ferrite), composed of a sintered composite of powdered iron oxide and barium/strontium carbonate ceramic; (2) alnico, made from casting or sintering aluminium, nickel and cobalt with iron and, optionally, minor amounts of other elements; and (3) alloys of rare earth (lanthanoid) elements, such as samarium-cobalt or neodymium-iron-boron (NIB) alloys.

The magnetic members in the array assembly can be of any shape or size. In some embodiments the magnetic members in the array are different sizes and shapes. In other embodiments, the magnetic members in the array are planar, square, or rectangular magnetic members. In yet other embodiments, the magnetic members are non-planar magnetic members, including, but not limited to, magnetic members having a spherical, circular, cylindrical, or rod shape. Preferably the all magnetic members in the array are planar magnetic members and have the same size and shape. In such an embodiment, the planar magnetic members have any suitable thickness. FIG. 4A, on the left, depicts a side view of an exemplary planar magnetic member (9) having a side (10) and two planar surfaces (11). In a preferred embodiment, the planar magnetic members will have four sides (10) and two planar surfaces (11). As shown in FIG. 4A, each planar magnetic member will have a magnetic field orientation, which is indicated here as a magnetic north pole (N) and a magnetic south pole (S). FIG. 4A, on the right, shows a perspective view of a typical planar magnetic member (9) with two sides (10) and one planar surface (11) that are visible from this perspective.

In certain embodiments, the planar magnetic members have sides (10) that are 0.1 inch thick or less. In other embodiments, the planar magnetic members have sides (10) that are 0.09, 0.08, 0.07, 0.06, 0.05, 0.04, 0.03, 0.02, or 0.01 inches thick, or less. In one embodiment, the planar magnetic members have sides (10) that are 0.02-0.04 inches thick, preferably 0.03 inches thick. The planar magnetic members can have planar surfaces (11) with horizontal dimensions of any suitable length. Preferably, the planar surfaces (11) of the planar magnetic members are between 0.1 and 1 inch wide and between 0.1 and 1 inch long, more preferably less than 0.5 inches wide and less than 0.5 inches long. In one preferred embodiment, the planar magnetic members have sides (10) that are very thin relative to the horizontal dimensions of their planar surface (11) so rotation between magnets assembled in an array can only be in increments of about 140, 150, 160, 170, 180, 190, 200, 210, or 220 degrees in relation to the adjacent magnet, preferably between about 160 degrees and about 200 degrees, more preferably between about 170 degrees and about 190 degrees, most preferably about 180 degrees.

Alternatively, the magnetic members in the array are non-planar and allow for a wider range of rotation angles. For example, the magnetic members in the array can be rod-shaped or cylindrical with each rod-shaped or cylindrical magnetic member having the same or different diameter and length. In some embodiments, the rod-shaped or cylindrical magnetic members have diameters that are 0.09, 0.08, 0.07, 0.06, 0.05, 0.04, 0.03, 0.02, or 0.01 inches thick, or less. The rod-shaped or cylindrical magnetic members may have any suitable length. Preferably, the rod-shaped or cylindrical magnetic members are between 0.1 and 1 inch long. In one embodiment, the rod-shaped or cylindrical magnetic members are rotated about 60, 70, 80, 90, 100, 110, 120, 130, 140, 150, 160, 170, 180, 190, 200, 210, or 220 degrees in relation to the adjacent magnetic member. In other embodiments, the magnetic members in the array are in the shape of a pyramid, sphere, circle, horseshoe, or any other desired shape.

FIG. 4A, on the right, depicts a preferred embodiment, in which a planar magnetic member has a magnetic field orientation along the longitudinal axis (12) of the planar magnetic member. As shown in FIG. 4A, on the right, the longitudinal axis (12) of a planar magnetic member is perpendicular to the planar surface (11) so that opposite planar surfaces (11) of each planar magnetic member has an opposing magnetic pole (indicated as (N) or (S)). One skilled in the art will understand that this is a simplistic diagram of a magnetic field and does not indicate the exact direction of the magnetic field at all points along the planar surface (11) or sides (10) of the planar magnetic member. In general, two planar magnetic members will be magnetically attracted to one another when their respective planar surfaces are brought to within joinable proximity so long as opposing magnetic poles are facing each other. Thus, the magnetic fields of the two magnetically attracted planar surfaces will be in substantially the same orientation. On the other hand, two planar magnetic members will be repelled from one another when their respective planar surfaces are brought to within close proximity if their respective planar surfaces have the same magnetic poles facing each other. Thus, the magnetic fields of the two repelled planar magnetic members are in substantially opposite orientations.

Figure 4B:
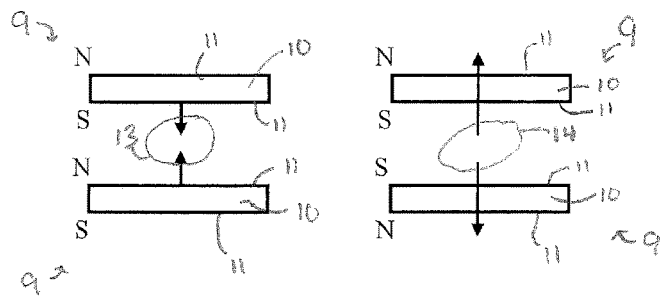
FIG. 4B, on the left, shows two planar magnetic members within joinable proximity of each other, with the magnetic north pole (N) and magnetic south pole (S) indicated, such that the two planar magnetic members will be attracted to one another. Arrows indicate the pull force between the planar magnetic members.

FIG. 4B, on the left, depicts a side view of two planar magnetic members (9) with planar surfaces (11) having opposing magnetic poles (N) and (S) within joinable proximity to each other. In such an alignment, the two planar magnetic members (9) have magnetic fields in substantially the same orientation. As the two planar magnetic members (9) are brought to within joinable proximity, they are magnetically attracted to one another by a pulling force (13). FIG. 4B, on the right, depicts a side view of two planar magnetic members (9) with planar surfaces (11) having the same magnetic poles (S) and (S) within close proximity to each other. In such an alignment, the two planar magnetic members (9) have magnetic fields in opposite orientations resulting in a repulsion force (14).

Figure 4C:
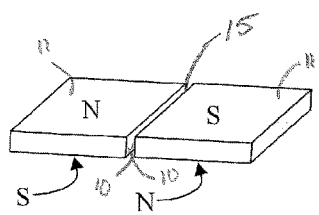
FIG. 4C depicts two planar magnetic members coupled together that have opposite magnetic fields.
Figure 4C:
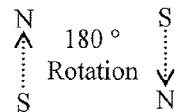
Figure 4D:
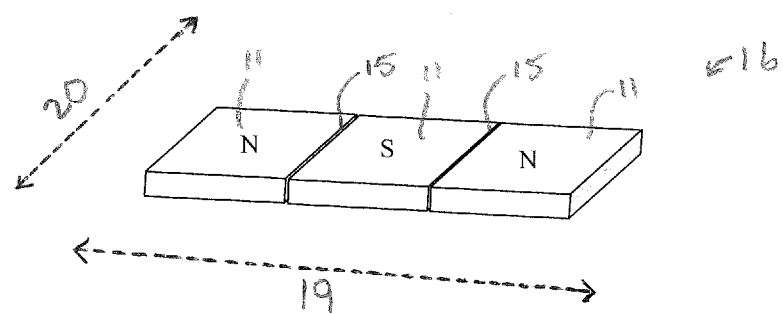
FIG. 4D shows a perspective view of a one-dimensional alternating magnetic field array.
Figure 4E:
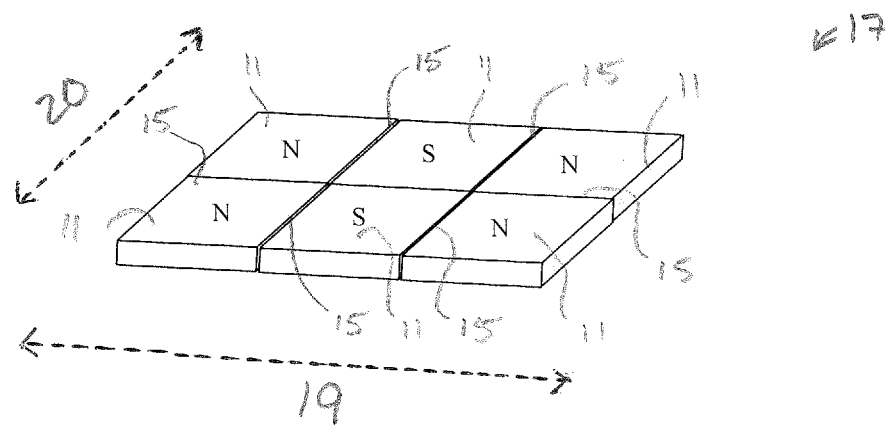
FIG. 4E depicts a perspective view of an alternative assembly of a one-dimensional alternating magnetic field array.

In some embodiments, two or more planar magnetic members are coupled together to form an array. FIG. 4C depicts two planar magnetic members coupled together at sides (10). The magnetic field orientation of each planar magnetic member is indicated (dotted arrow). In FIG. 4C, the two planar magnetic members have magnetic fields in substantially opposite orientations. In this nonlimiting example, the magnetic field of one planar magnetic member is rotated about 180 degrees in relation to the other planar magnetic member thus allowing the two planar magnetic members to be held together at the point of coupling (15) by magnetic attraction at sides (10). In another embodiment, the array is composed of planar magnetic members coupled together in a single linear dimension as shown in FIG. 4D. In yet another embodiment, the array is composed of planar magnetic members coupled together in two dimensions as shown in FIG. 4E and FIG. 7A.

In the arrays of the present invention, the magnetic field of a planar magnetic member can be in substantially the same orientation as the magnetic field of an adjacent planar magnetic member to which it is coupled. Alternatively, the magnetic field of a planar magnetic member is rotated about 160 degrees to about 200 degrees in relation to the magnetic field of an adjacent planar magnetic member to which it is coupled. In one particular embodiment, the array is composed of planar magnetic members coupled together in a single linear dimension, and each planar magnetic member has a magnetic field that is rotated about 180 degrees in relation to the magnetic field of each adjacent planar magnetic member to which it is coupled. Such an embodiment is depicted in FIG. 4D. This array (16) has an alternating magnetic field in one dimension (19) due to the approximate 180 degree rotation of each coupled planar magnetic member and is sometimes referred to herein as a "one-dimensional alternating magnetic field array."

In another embodiment, each planar magnetic member is coupled to at least one other planar magnetic member in two dimensions. According to FIG. 4E, such an array (17) can be assembled with each planar magnetic member having a magnetic field that is rotated about 180 degrees in relation to the magnetic field of each adjacent planar magnetic member in one dimension (19) and a magnetic field that is in substantially the same orientation as the magnetic field of each adjacent planar magnetic member in the second dimension (20). This type of array assembly will exhibit an oscillating or alternating magnetic field in one dimension and will also be referred to herein as a "one-dimensional alternating magnetic field array."

In certain embodiments, the planar members of the one-dimensional alternating magnetic field arrays are held together by magnetic attraction due to the opposing magnetic field orientations of the coupled planar magnetic members. Alternatively, the planar magnetic members can be held to together at the point of coupling (15) by any adhesive known in the art, including, but not limited to, glue, cement, epoxy resin, or tape. Such adhesive can be directly applied to a side (10) of each planar magnetic member at the point of coupling (15), and the adhesive may be comprised of magnet-attracted material or may be composed of substantially non-magnet-attracted material. Nonlimiting examples of suitable magnet-attracted materials are chromium(IV) oxide, cobalt, dysprosium, ferrite, gadolinium, gallium manganese arsenide, iron, magnetite, neodymium/iron/boron alloy, nickel, permalloy (nickel-iron magnetic alloy), samarium/cobalt alloy, suessite, yttrium iron garnet, and appropriate combinations thereof. Alternatively, the adhesive can be applied across the top or bottom planar surfaces (11) of each planar magnetic member in the one-dimensional alternating magnetic field arrays (16) and (17). In certain arrays, two planar members having magnetic fields in substantially the same orientation are coupled together such as the one-dimensional alternating magnetic field array (17) shown in FIG. 4E. In such a case, it may be desirable to apply a non-magnetic and non-magnet-attracted material to the sides (10) of the planar magnetic members at the point of coupling (15) to hold the planar magnetic members together because of their tendency to magnetically repel each other. In some embodiments, the points of coupling (15) of a one-dimensional alternating magnetic field arrays (16) or (17) are filled with any flexible elastomeric material to give the array added flexibility.

Figure 5A:
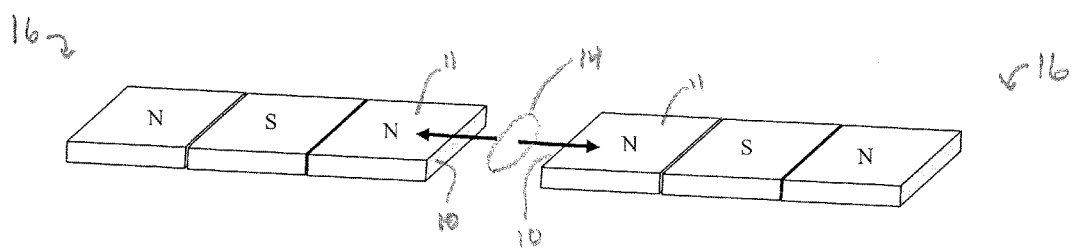
FIG. 5A depicts one-dimensional alternating magnetic field arrays being repelled from one another. Arrows indicate the repulsive force between the one-dimensional alternating magnetic field arrays.
Figure 5B:
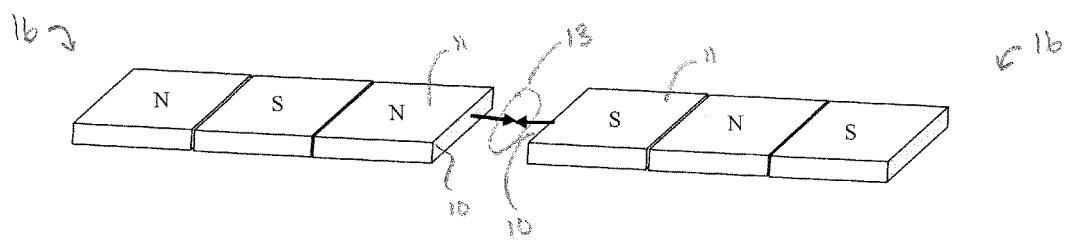
FIG. 5B depicts one-dimensional alternating magnetic field arrays being magnetically attracted to each other. Arrows indicate the pull force between the one-dimensional alternating magnetic field arrays.

FIG. 5A depicts two arrays (16) where the planar magnetic members at the end of each array have magnetic fields in substantially the same orientation as shown by the same magnetic poles (N) and (N) on their respective planar surfaces (11), which creates a repulsion force (14) and prevents magnetic attachment at the sides (10) of the arrays (16). FIG. 5B depicts two arrays (16) in which the planar magnetic member at the end of one array (16) has a magnetic field that is rotated about 180 degrees in relation to the magnetic field of the planar magnetic member at the end of the other array (16) as shown by opposing magnetic poles (N) and (S) on their respective planar surfaces (11). As these arrays (16) are brought to within joinable proximity of each other, the opposing magnetic poles (N) and (S) create a pulling force (13) and allows magnetic attachment at the sides (10) of the arrays (16).

FIG. 6A, FIG. 6B, and FIG. 6C depict the alternating pulling and repulsive effect between one-dimensional alternating magnetic field arrays. Each array (16) is composed of planar magnetic members having a magnetic field rotated about 180 degrees in relation to the planar magnetic field of each adjacent planar magnetic member. A pulling force (13) is created between each pair of planar magnetic members that have substantially the same magnetic field orientation (opposing magnetic poles facing each other) as their respective planar surfaces are brought to within joinable proximity resulting in the amplification of their combined magnetic field strength. According to FIG. 6C, as more planar magnetic members of one array (16) are magnetically attached to the planar magnetic members of the other array (16), the greater the pulling force (13) between the two arrays (16). On the other hand, as shown in FIG. 6B, a repulsive force (14) is created between two planar magnetic members with opposite magnetic field orientations (same magnetic poles facing each other) as their respective planar surfaces are brought to within close proximity.

The advantage of using one-dimensional alternating magnetic field arrays in the present invention instead of conventional magnet arrangements is that the alternating magnetic field orientation of the array reduces lateral slippage or sliding of the attraction layers. As noted above, when two planar magnetic members are magnetically attached, the magnetic field of each is amplified creating a stronger pulling force. Thus, as shown in FIG. 6D, each planar magnetic member of the top array (16) is magnetically attached to a planar magnetic member of the bottom array (16) thereby creating a pulling force (13) between each magnetic pairing. In addition, there is a repulsive force (18) between each planar magnetic member and the planar magnetic member adjacent to the planar magnetic member to which it is magnetically attached. This repulsive force (18) reduces lateral sliding or slipping between the top and bottom arrays (16) in a first dimension (19). The arrays (16) can be separated by pulling apart in the direction of the longitudinal axis (21) or, alternatively, along the lateral axis in a second dimension (20) in which there is no alternating magnetic field configuration to provide the repulsive force necessary to reduce lateral slipping or sliding in the second dimension (20). In addition, the alternating magnetic field of a single one-dimensional alternating magnetic field array, such as array (16) or (17), can reduce lateral slipping or sliding between that array and an attachment layer or any other magnet-attracted material, albeit to a lesser extent than that exhibited by two such arrays used in combination.

It is contemplated that the one-dimensional alternating magnetic field array can be assembled to contain any number of planar magnetic members in either the alternating magnetic field dimension or the non-alternating magnetic field dimension based on the size, shape, and length of the attraction layer that is desired. The attraction layer containing the one-dimensional alternating magnetic field array can be the same size, shape and length of the attachment layer and/or optional intensification layer or, alternatively, the layers can be different sizes, shapes and/or lengths. In another embodiment, at least two attraction layers can be used in the present invention in which at least one attraction layer contains a one-dimensional alternating magnetic field array and at least one attraction layer contains a magnetic material that is not assembled as a one-dimensional alternating magnetic field array. In such an embodiment, the attraction layers can be the same size, shape and length or different sizes, shapes and/or lengths. In addition, at least two attraction layers can be used in the present invention in which at least two attraction layers contain one-dimensional alternating magnetic field arrays, which can be the same size, shape, and length, or different sizes, shapes and/or lengths. Further, the planar magnetic members can be the same size and shape or different sizes and shapes, preferably each planar magnetic member will be the same size and shape and have a side (10) that is much thinner that the horizontal dimensions of the planar surface (11) so as to only allow rotation of the planar magnetic member in increments of about 160 degrees to about 200 degrees in the array assembly, preferably about 180 degrees. In certain embodiments, each magnet is rotated about 140, 150, 160, 170, 180, 190, 200, 210, or 220 degrees in relation to the adjacent magnet, preferably between about 160 degrees and about 200 degrees, more preferably between about 170 degrees and about 190 degrees, most preferably about 180 degrees. In some embodiments, it may be desirable to construct an array assembly with a one-sided flux, in such an embodiment the array is assembled using magnetic members in the shape of a rod or square in which each subsequent magnetic member is rotated between about 70 degrees and about 100 degrees in relation to the adjacent magnetic member, preferably about 90 degrees. In other embodiments, the array is assembled using magnetic members in the shape of a rod or cylinder in which each subsequent magnetic member is rotated about 60, 70, 80, 90, 100, 110, 120, 130, 140, 150, 160, 170, 180, 190, 200, 210, or 220 degrees in relation to the adjacent magnetic member. In other embodiments, the magnetic members in the array are in the shape of a pyramid, sphere, circle, horseshoe, or any other desired shape, and rotated between about 60 degrees to about 220 degrees in relation to the adjacent magnetic member.

FIG. 7A depicts an array (22) can be assembled so that each planar magnetic member has a magnetic field that is rotated about 180 degrees in relation to the magnetic field of each adjacent planar magnetic member to which it is coupled in both a first dimension (19) and a second dimension (20) to create alternating magnetic fields in both dimensions and is sometimes referred to herein as a "two-dimensional alternating magnetic field array." In a preferred embodiment, at least one attraction layer is composed of a two-dimensional alternating magnetic field array. In a more preferred embodiment, two attraction layers are used and each attraction layer is composed of a two-dimensional alternating magnetic field array.

As with the one-dimensional alternating magnetic field array, in some embodiments the planar magnetic members of the two-dimensional alternating magnetic field array (22) are held in place at the point of coupling (15) by magnetic attraction. Alternatively, the planar magnetic members can be held together at the point of coupling (15) by any adhesive known in the art, including, but not limited to, glue cement, epoxy resin or tape. Such adhesive can be directly applied to a side of each planar magnetic member at the point of coupling (15). The adhesive may be composed of magnet-attracted material or may be composed of substantially non-magnet-attracted material. Nonlimiting examples of suitable magnet-attracted materials are chromium(IV) oxide, cobalt, dysprosium, ferrite, gadolinium, gallium manganese arsenide, iron, magnetite, neodymium/iron/boron alloy, nickel, permalloy (nickel-iron magnetic alloy), samarium/cobalt alloy, suessite, yttrium iron garnet, and appropriate combinations thereof. Alternatively, the adhesive can be applied across one or both planar surfaces (11) of each planar magnetic member in the array (22). In some embodiments, the points of coupling (15) of a two-dimensional alternating magnetic field arrays (22) are filled with any flexible elastomeric material to give the array added flexibility.

Figure 7B:
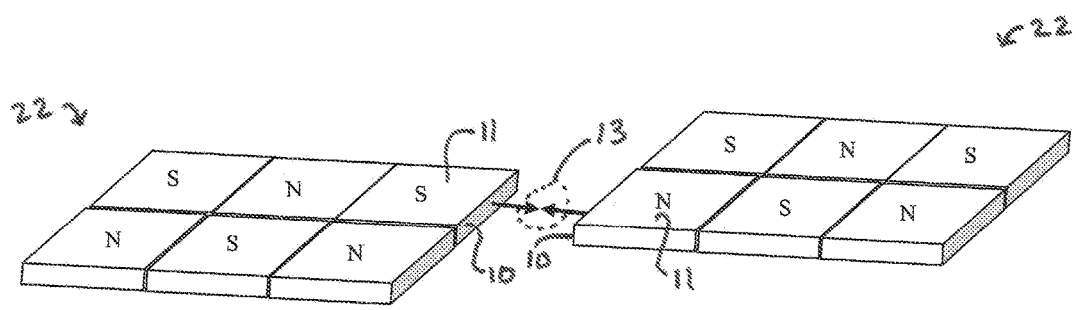
FIG. 7B depicts two-dimensional alternating magnetic field arrays being magnetically attracted to each other. Arrows indicate the pull force between the two-dimensional alternating magnetic field arrays.
Figure 7C:
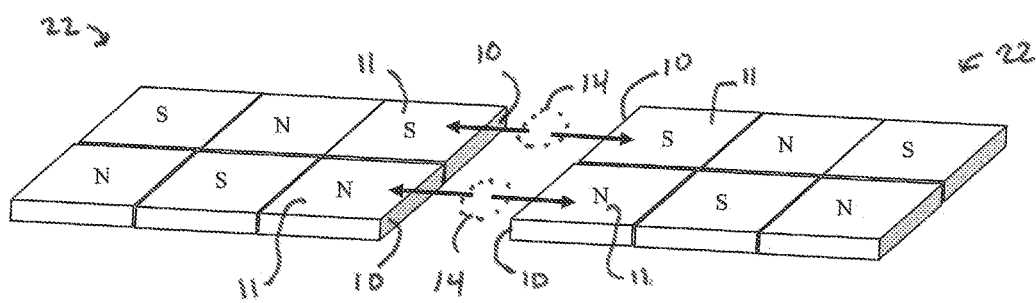
FIG. 7C depicts two-dimensional alternating magnetic field arrays being repelled from one another. Arrows indicate the repulsive force between the two-dimensional alternating magnetic field arrays.

FIG. 7B depicts two arrays (22) in which the planar magnetic member at the end of one array (22) has a magnetic field that is rotated about 180 degrees in relation to the magnetic field of the planar magnetic member at the end of the other array (22) as shown by the opposing magnetic poles (N) and (S) on their respective planar surfaces (11). As these arrays (22) are brought to within joinable proximity to each other, the opposing magnetic poles (N) and (S) create a pulling force (13) and allows magnetic attachment at the sides (10) of the arrays (22). FIG. 7C depicts two arrays (22) where the planar magnetic members at the end of each array have magnetic fields in substantially the same orientation as shown by the same magnetic poles on their respective planar surfaces (11), which creates a repulsion force (14) and prevents magnetic attachment at the sides (10) of the arrays (22).

Figure 8A:
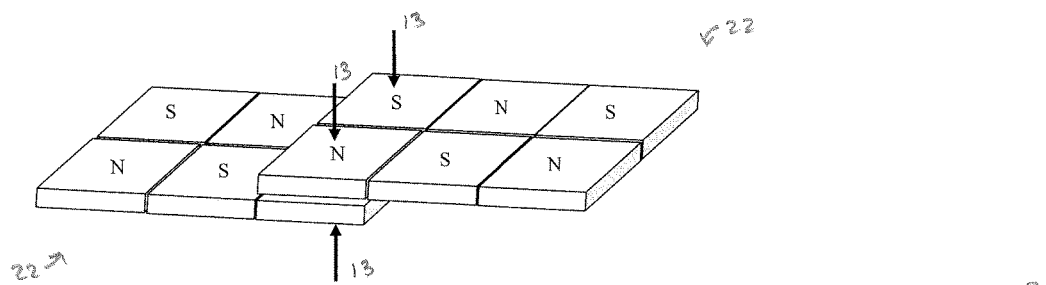
FIG. 8A depicts two-dimensional alternating magnetic field arrays magnetically attached to each other. Arrows indicate the pull force between the two-dimensional alternating magnetic field arrays.
Figure 8B:
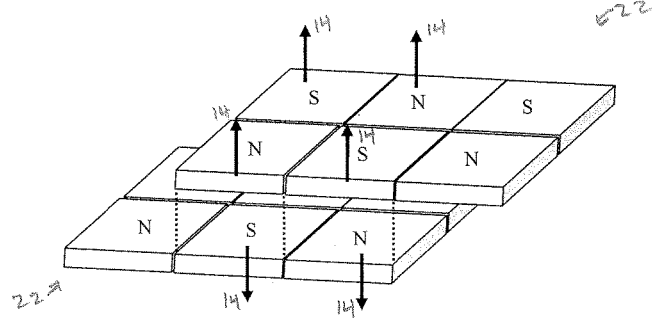
FIG. 8B depicts two-dimensional alternating magnetic field arrays being repelled from one another. Arrows indicate the repulsive force between the two-dimensional alternating magnetic field arrays.
Figure 8C:
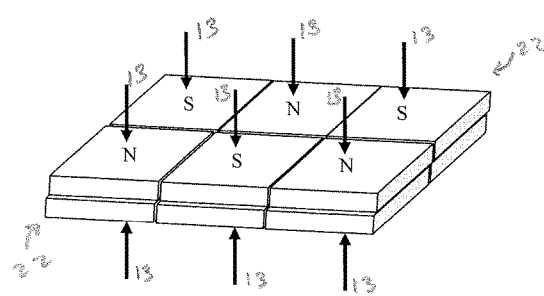
FIG. 8C depicts two-dimensional alternating magnetic field arrays magnetically attached to each other. Arrows indicate the pull force between the two-dimensional alternating magnetic field arrays.

FIG. 8A, FIG. 8B, and FIG. 8C depict the alternating pulling and repulsive effect between two-dimensional alternating magnetic field arrays. Each array (22) is composed of planar magnetic members having a magnetic field rotated about 180 degrees in relation to the magnetic field of each adjacent planar magnetic member. A pulling force (13) is created between each pair of planar magnetic members that have substantially the same magnetic field orientation (opposing magnetic poles facing each other) as their respective planar surfaces are brought to within joinable proximity resulting in the amplification of their combined magnetic field strengths. According to FIG. 8C, as more planar magnetic members of one array (22) are magnetically attached to the planar magnetic members of the other array (22), the greater the pulling force (13) between the two arrays (22). On the other hand, as shown in FIG. 8B, a repulsive force (12) is created between two planar magnetic members with opposite magnetic field orientations (same magnetic poles facing each other) as their respective planar surfaces are brought to within close proximity.

Figure 8D:
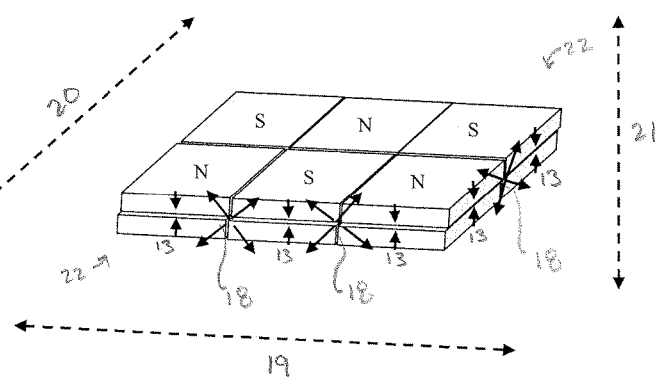
FIG. 8D depicts two-dimensional alternating magnetic field arrays magnetically attached to one another, which prevents lateral slipping or sliding in two dimensions.

A two-dimensional alternating magnetic field array significantly reduces lateral slippage or sliding in two dimensions due to its two-dimensional alternating magnetic field orientation. As noted above, when two planar magnetic members are magnetically attached, the magnetic field of each is amplified creating a stronger pulling force. Thus, as shown in FIG. 8D, each planar magnetic member of the top array (22) is magnetically attached to a planar magnetic member of the bottom array (22) thereby creating a pulling force (13) between each magnetic pairing. In addition, there is a repulsive force (18) between each planar magnetic member and the planar magnetic member adjacent to the planar magnetic member to which it is magnetically attached. This repulsive force (18) reduces lateral sliding or slipping between the top and bottom arrays (22) in a two dimensions (19) and (20). The arrays can be separated by pulling apart in the direction of the longitudinal axis (21). In addition, the alternating magnetic field of a single two-dimensional alternating magnetic field array, such as array (18), can reduce lateral slipping or sliding between that array and an attachment layer or any other magnetic-attracted material, albeit to a lesser extent than that exhibited by two such arrays used in combination.

The two-dimensional alternating magnetic field arrays of the present invention can be assembled to contain any number of planar magnetic members in either lateral dimension based on the size, shape, and length of the attraction layer that is desired. The attraction layer containing the two-dimensional alternating magnetic field array can be the same size, shape and length of the attachment layer and/or optional intensification layer or, alternatively, the layers can be different sizes, shapes and/or lengths. In another embodiment, at least two attraction layers can be used in the present invention in which at least one attraction layer contains a two-dimensional alternating magnetic field array and at least one attraction layer contains a magnetic material that is not assembled as a two-dimensional alternating magnetic field array. In such an embodiment, the attraction layers can be the same size, shape and length or different sizes, shapes and or lengths. In addition, at least two attraction layers can be used in the present invention in which each attraction layer contain a two-dimensional alternating magnetic field arrays, which can be the same size, shape and length, or different sizes, shapes and/or lengths. Further, the planar magnetic members can be the same size and shape or different sizes and shapes, preferably each planar magnetic member will be the same size and shape and have a side (10) that is much thinner that the horizontal dimensions of the planar surface (11) so as to only allow rotation of the planar magnetic member in increments of about 160 degrees to about 200 degrees in the array assembly, preferably about 180 degrees. In certain embodiments, each magnet is rotated about 140, 150, 160, 170, 180, 190, 200, 210, or 220 degrees in relation to the adjacent magnet, preferably between about 160 degrees and about 200 degrees, more preferably between about 170 degrees and about 190 degrees, most preferably about 180 degrees. In yet other embodiments, the magnetic members are rod or square shaped.

In some embodiments, it may be desirable to construct a two-dimensional alternating magnetic field array using magnetic members in the shape of a rod or cylinder in which each subsequent magnetic member is rotated about 60, 70, 80, 90, 100, 110, 120, 130, 140, 150, 160, 170, 180, 190, 200, 210, or 220 degrees in relation to the adjacent magnetic member. In other embodiments, the magnetic members in the array are in the shape of a pyramid, sphere, circle, horseshoe, or any other desired shape, and rotated between about 60 degrees to about 220 degrees in relation to the adjacent magnetic member. In yet other embodiments, a one- or two-dimensional alternating magnetic field array may be constructed using magnetic members of any desired shape and size wherein the magnetic members in the array may have different rotation angles in relation another magnetic member. For example, a magnetic member may be rotated about 90 degrees in relation to one adjacent magnetic member, but 180 degrees in relation to a second adjacent magnetic member. In another example, one magnetic member may be rotated about 180 degrees in relation to an adjacent magnetic member in one or two dimensions, but a second magnetic member may be rotated about 90 degrees in relation to an adjacent magnetic member in one or two dimensions.

In certain embodiments, at least one attraction layer is composed of a one-dimensional alternating magnetic field array, preferably, at least two attraction layers are composed of one-dimensional alternating magnetic field arrays. In yet another embodiment, at least one attraction layer is composed of a two-dimensional alternating magnetic field array, preferably at least two attraction layers are composed of two-dimensional alternating magnetic field arrays. In certain embodiments, the planar magnetic members of the array(s) are held together by an adhesive glue, cement or tape. In other embodiments, the one- or two-dimensional alternating magnetic field arrays contain an elastomeric material in between each of the coupled planar magnetic members to allow greater flexibility. In still other embodiments, the elastomeric material in between each of the coupled planar magnetic members is an elastomeric material capable of being softer and more pliable when exposed to elevated temperatures. In other embodiments, the planar magnetic members of the array(s) are contained within water repellant or water resistant material. In yet other embodiments, the planar magnetic members are contained within rubberized or plastic material.

In some aspects of the invention, two attachment layers are affixed to an article, such as an article of clothing, for which a closure or fastening mechanism is desired. The attachment layers can be composed of any suitable ferromagnetic material. For example, the attachment layers can be rubber infused with iron particles in sufficient quantity to facilitate magnetic a pulling force when brought to within joinable proximity to the attraction layer. In this example, the attachment layers are affixed to either side of an opening in the article of clothing where closure or fastening is desired. The attraction layer can then be incorporated into the article of clothing as a removable insert placed between the two attachment layers to form the functional equivalent of a zipper or a row of buttons. In other embodiments, two attraction layers can be used and incorporated into the article of clothing as an insert on either side of an opening in the article of clothing where closure or fastening is desired. Such embodiments may also use at least one array that is a one- or two-dimensional alternating magnetic field array, preferably at least two arrays that are one- or two-dimensional alternating magnetic field arrays, most preferably at least two arrays that are two-dimensional alternating magnetic field arrays. Using two arrays will take full advantage of the alternating magnetic fields and significantly reduce lateral sliding or slipping of the attraction layers.

Figure 9A:
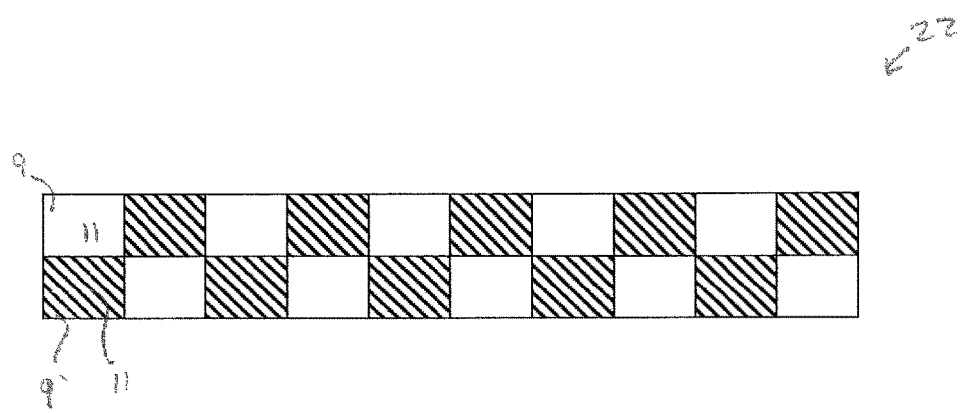
FIG. 9A shows an attraction layer composed of a two-dimensional alternating magnetic field array with alternating magnetic poles (hatched and white squares).
Figure 9B:
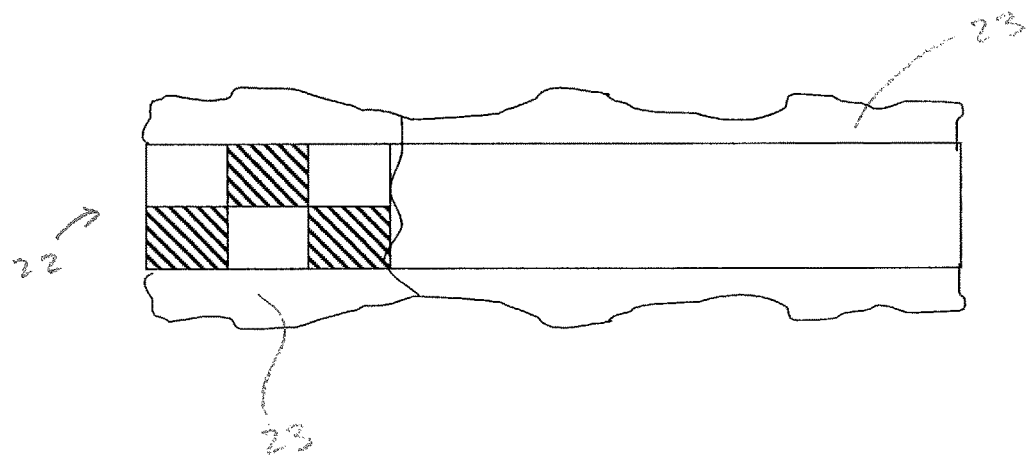
FIG. 9B shows an attraction layer composed of a two-dimensional alternating magnetic field array affixed between two pieces of fabric.

FIG. 9B depicts a top view of an attraction layer composed of a two-dimensional alternating magnetic field array (22). Alternating magnetic fields are shown by alternating white and hatched squares. The array (22) is shown disposed between two strips of fabric (23). In one embodiment, the array (22) is removable from the fabric (23). In another embodiment, the array (22) is encased in plastic, rubber, or some other elastomeric material and is readily removable from the fabric (23). In yet another embodiment, an elastomeric material is disposed in the point of coupling between each coupled planar magnetic member of the array to allow for greater flexibility. On yet another embodiment, tape or other adhesive material is disposed in the point of coupling between each coupled planar magnetic member, along the planar surface of each planar magnetic member in the array, or both. The planar magnetic members of FIG. 9B are preferably between 0.01 and 0.09 inches thick, between 0.1 and 1 inch wide, and between about 0.1 and 1 inch long. In a more preferred embodiment, the planar magnetic members are less than 0.04 inches thick, less than 0.25 inches wide, and less than 0.25 inches long to decrease the radius of curvature thereby rendering the magnetic members less visible through an article or piece of fabric. Alternatively, the magnetic members of the attraction layer depicted in FIG. 9B are non-planar.

The pull force between two attraction layers composed of either one-dimensional alternating magnetic field arrays, two-dimensional alternating magnetic field arrays, or a combination thereof, or, alternatively between an attachment layer and an attraction layer composed of either a one-dimensional alternating magnetic field array or a two-dimensional alternating magnetic field array should be in excess of about one pound (i.e., the amount of force required to pull one layer away from the other layer). In certain embodiments, it is greater than about 2, 2.5, 3, 3.5, 4, 4.5, or 5 pounds. In other embodiments, it can be greater than 6, 7, 8, 9, or 10 pounds. In other embodiments, it can be greater than 15, 20, 25, 30, 35, 40, or 50 pounds. As a practical matter, the pull force should be sufficient to enable to layers to perform their function as described herein, but not so great as to delaminate the layers, pull the planar magnetic members apart, or tear the garments or other materials on which they are used. Pull force in the one-dimensional alternating magnetic field arrays and two-dimensional alternating magnetic field arrays is governed by the magnetic strength of the magnetic material and the cumulative surface area between the magnetically attached planar magnetic members.

The attraction layer(s), attachment layer(s) and optional intensification layer(s) described above are used in system for joining two or more materials or articles in a variety of different ways. In general, one or more attachment layers and one or more attraction layers are affixed to one or more of the articles, wherein increasing proximity (to within joinable proximity) of an attraction layer to the attachment layer causes joining of the articles. Alternatively, two or more attraction layers are affixed to one or more of the articles, wherein increasing proximity (to within joinable proximity) of one attraction layer to another attraction layer causes joining of the articles.

In one embodiment, the attraction layer is affixed to one article, such as a piece of fabric or an article of clothing, and an attachment layer is affixed to another article. Joining of the articles is achieved by placing the attraction layer in joinable proximity to the attachment layer. In this embodiment, either or both of the attraction layer or the attachment layer can be removably attached to or inserted into the respective articles. If the articles are to be washed or dry-cleaned, it is preferable that the attraction layer is removable so that it can be removed prior to washing. The attachment layer can be made removable for the same reason, or it can be enclosed in substantially water or fluid resistant or repellent material. Alternatively, two attraction layers can be used in the same manner. In other words, a first attraction layer is affixed to one article, such as a piece of fabric or an article of clothing, and a second attraction layer is affixed to another article. Both attraction layers can be removable prior to washing. Where reduced lateral slipping between attraction layers or between an attraction layer and an attachment layer is desired, the attraction layer(s) can be composed of an array such as a one-dimensional alternating magnetic field array or a two-dimensional alternating magnetic field array.

In another embodiment, an attachment layer is affixed to each article to be joined, and joining is achieved by placing each attachment layer in joinable proximity to an attraction layer that is not affixed to the articles, such that the attraction layer is sandwiched between the attachment layers, thereby joining the articles. This embodiment enables the attraction layer to be used "universally," i.e., for joining or closing any article that contains attachment layers. For instance, an individual may possess several garments, e.g., skirts, slacks, wrap dresses or the like, each containing attachment layers at the attachment surfaces (the surfaces desired to be joined), and only a single attraction layer that can be used to join or close any of the garments, or join them to one another. Here, the attraction layer need not be enclosed in or sandwiched between other materials; it may simply comprise a flexible strip or sheet magnet, for instance. In this embodiment, the attachment layer(s) can be made removable or can be enclosed in water- or fluid-resistant material, as described above. Alternatively, where a reduction in lateral slipping between the attachment layer and the attraction layer is desired, the attraction layer can be composed of either a one-dimensional alternating magnetic field array or a two-dimensional alternating magnetic field array. In addition, a second attraction layer composed of either a one-dimensional alternating magnetic field array or a two-dimensional alternating magnetic field array can be used in addition to or instead of the attachment layer.

In either of the aforementioned systems, the materials or articles to be joined are of the same or similar type, e.g., two pieces of fabric, or other materials used in clothing or accessories. In one embodiment, the system is used as a closure system in a single article of clothing, e.g., to replace zippers, buttons, ties, VELCRO, or other similar types of closure. In another embodiment, the system is used to join two or more articles of clothing together, e.g., to secure a shirt or top to a skirt or slacks.

In yet another embodiment, the system is used to secure an article of clothing to its wearer. In this embodiment, an attraction layer or an attachment layer is affixed to the wearer's body at the desired location, using a commercially available body adhesive. An attraction or attachment layer (whichever was not used on the body) is affixed to the article of clothing at the location desired to be secured to the body. Alternatively, two attraction layers can be used where one attraction layer is affixed to the wearer's body at a desired location and another attraction layer is affixed to an article of clothing at the location desired to be secured to the body.

The garment is secured to the wearer's body by bringing the layer on the garment and the layer on the body into joinable proximity. In yet another embodiment, the attraction layer affixed to the wearer's body and/or the attraction layer affixed to the article of clothing at a location desired to be secured to the body can be composed of either a one-dimensional alternating magnetic field array or a two-dimensional alternating magnetic field array. In such embodiments, the choice to use either a one-dimensional alternating magnetic field array or a two-dimensional alternating magnetic field array as an attraction layer (or to replace an attachment layer) depends on the whether a reduction in lateral slipping in one direction is desired or whether a reduction in lateral slipping in both directions is desired. For example, using a one-dimensional alternating magnetic field array can be used to reduce lateral sliding in one direction, but allow for quick and easy adjustments in the other lateral direction. On the other hand, using a two-dimensional alternating magnetic field array can be used to reduce lateral sliding in two directions.

In still another embodiment, the repulsion feature of the system can be used to position or guide a portion of a wearer's or user's body to an optimum fit within an article of clothing or an accessory, for instance. For example, two attractions layers can be oriented to repel each other, e.g., between the shoulder strap of a carrying case and the shoulder strap of an undergarment, to displace the weight of the carrying bag over a wider surface on the wearer's shoulder, thereby decreasing pain or discomfort. Similarly, attraction layers in their repulsion orientations can be affixed to the footbed of a high heeled shoe and the ball of the wearer's foot, to displace and relieve the downward pressure of the foot in the shoe.

The following examples are provided to describe the invention in greater detail. They are intended to illustrate, not to limit, the invention.

Example 1

An attachment layer is sewn into or onto the waistband of a pair of slacks. An attraction layer (either singly or in pieces) is made to adhere (temporarily) to the skin of the wearer or to the lower part of the wearer's shirt or blouse. By this mechanism, the wearer can prevent his/her slacks from slipping too far down or the shirt/blouse from pulling out of the slacks.

Example 2

Nursing mothers need to have a quick and easy mechanism to enable their infants to nurse. Often the infant is not being very patient and the mother has only one hand available for opening her blouse. One or more attraction, attachment and optional intensification layers are incorporated into the maternity wear to enable easy opening an closure, and to provide a mechanism for the mother to make her blouse or dress top be less baggy and have a more flattering look.

Example 3

Straps that go over the shoulder often slip off or press tightly against the shoulder, the latter causing significant pain if the weight on the shoulder is great. In the case of the sliding strap, an attraction layer in either the strap or in a corresponding pad incorporated into the garment when coupled with an attachment layer will prevent slippage. In the second case, a second attraction layer reversed in polarity from the primary attraction layer will provide repulsion enabling the pressure to be spread over a larger area, thereby decreasing the pain.

Example 4

For wrap-around garments, an attachment layer in the "inside" part of the garment (mounted in a direction parallel to the wearer's waist) coupled with a similarly oriented attraction layer in the "outside" part of the garment provides a continually adjustable closure without the need for buttons and button holes. Depending on the desire of the wearer, the attachment layer can be replaced with another attraction layer. Furthermore, one or more attraction layers can contain one- or two-dimensional alternating magnetic field arrays to reduce lateral slippage in at least one dimension.

Example 5

An attraction layer is caused to adhere to the wearer's skin and matches up with an attraction layer in the garment. For example, a tee shirt with absolutely no back will have its attraction layers oriented vertically starting just below the arm pits. A second attraction layer is similarly aligned but fastened to the wearer's skin, e.g., with body adhesive or surgical or waterproof tape. Until the wearer explicitly pulls the closure apart, it will stay together regardless of moisture or movement.

Example 6

Often, a zipper or comparable closure requires a second party to complete its alignment. The attachment and attraction layers of the present system are self-aligning so, for example, a woman's dress would automatically close in back with a straight seam. An optional guiding device (analogous to a back scratcher) can also be employed.

Example 7

A wearer may wish to have a closure seam comprising a continuously variable degree of contact. For example, a blouse could be fully closed in a formal or business environment, but worn significantly more open in an informal or private setting. An external (hand held) magnet when waved over the closure system of the invention will cause a part of the closure to open, in exactly the amount desired by the wearer.

Example 8

Certain styles of shoes are difficult to wear without the feet slipping out. An attraction layer is built into the shoe and a small attachment layer (pad) is made to adhere to an unobtrusive part of the wearer's foot (e.g., at the back of the heel), thereby enabling the foot to be held in place within the shoe much more firmly.

Example 9

People who wear high-heeled shoes and stockings have a high incidence of orthopedic problems caused by the foot sliding forward and being compressed by the sides of the shoe. An attraction layer is placed inside the shoe and a reversed attraction layer (generating repulsion) is taped or affixed to the foot, thereby impeding the forward slide of the foot in the shoe.

Example 10

People who have had limbs amputated, particularly legs, have a range of abnormal problems. The sweat glands near the stump are far more prolific than normal. If the corresponding socket in the prosthetic device is not an almost perfect fit and has an efficient wicking material to draw away the moisture, a range of skin irritations, rashes, and lesions results. A combination of attraction layers of either aligned or reversed polarity will help keep the stump in the proper position and will minimize chafing in a less than perfect fit situation.

Example 11

The key to a good game of golf is proper hand position on the club. Golf clubs with an attraction layer incorporated into the handle (at the proper position and angle) will interact with an attachment layer (or second attraction layer) in the golf glove, insuring correct orientation and alignment.

Example 12

For creative fashion designs, the present invention can be used to replace straps and backs of dresses and gowns. Attraction layers can be adhered to the wearer's body, e.g., with body adhesive or surgical or waterproof tape, at various locations where the wearer desires to attach the dress or gown. A second attraction layer is affixed to the dress or gown at certain attachment points that will adhere the gown to the body at any desired location.

Example 13

Another use of the present invention is with jewelry. For example, attachment or attraction layers can be affixed to the wearer's neck or chest. A second attraction layer can be affixed to the back of a pendant or necklace which alleviates the need for a full chain to hold jewelry around the wearer's neck and provides for a whole range of elegant futuristic looks. To ensure that the jewelry stays securely in place, one or both attraction layers can be composed of either a one- or two-dimensional alternating magnetic field array.

Example 14

The present invention can be incorporated into sports bras to allow the wearer to adjust between adequate support and a more relaxed, comfortable fit. One or more attraction layers can be affixed to the wearer's skin in desired locations. A set of attraction layers can be affixed to various locations on the garment. The wearer has the ability to adjust the sports bra to provide better support during exercise. Then, during the cool down phase, the wearer can re-adjust the sports bra to provide a looser, more relaxed fit.

The present invention is not limited to the embodiments described and exemplified above, but is capable of variation and modification within the scope of the appended claims.

What is claimed:

1. A system for joining two or more articles, comprising:
a first attraction layer comprising a magnetic material, and a second attraction layer comprising a magnetic material, wherein the first attraction layer or the second attraction layer, or both, are affixed to one or more of the articles, wherein increasing the proximity of the first attraction layer to the second attraction layer causes joining of the articles, and wherein:
a) each of the first attraction layer and the second attraction layer further comprises a plurality of planar magnetic members, each planar magnetic member comprising a magnetic field having a magnetic orientation;
b) each planar magnetic member is coupled to at least two other planar magnetic members in an array, wherein the array comprises a first dimension and a second dimension, and wherein the magnetic orientation of each planar magnetic member is rotated about 160 degrees to about 200 degrees in relation to the magnetic orientation of each planar magnetic member to which it is coupled in the first dimension; and
c) the magnetic orientation of each planar magnetic member: (i) is rotated about 160 degrees to about 200 degrees in relation to the magnetic orientation of each planar magnetic member to which it is coupled in the second dimension, or (ii) is substantially the same as the magnetic orientation of each planar magnetic member to which it is coupled in the second dimension.

2. The system of claim 1, wherein
the magnetic orientation of each planar member is substantially the same as the magnetic orientation of each planar magnetic member to which it is coupled in the second dimension.

3. The system of claim 1, further comprising an elastomeric material, an adhesive material that is not magnet-attracted, or both an elastomeric material and an adhesive material that is not magnet-attracted, in between planar magnetic members that are coupled.

4. The system of claim 1, wherein the first attraction layer is affixed to one article and the second attraction layer is affixed to another article, wherein joining is achieved by placing the first attraction layer in joinable proximity to the second attraction layer, such that the planar magnetic members of the first attraction layer and the planar magnetic members of the second attraction layer are each positioned with opposite magnetic poles facing each other, whereby sliding of the first attraction layer along a lateral axis of the second attraction layer is reduced in the first dimension.

5. The system of claim 1, wherein the magnetic orientation of each planar magnetic member is rotated about 160 degrees to about 200 degrees in relation to the magnetic orientation of each planar magnetic member to which it is coupled in both the first dimension and the second dimension.

6. The system of claim 5, further comprising an elastomeric material, an adhesive material that is not magnet-attracted, or both an elastomeric material and an adhesive material that is not magnet-attracted, in between planar magnetic members that are coupled.

7. The system of claim 5, wherein the first attraction layer is affixed to one article and the second attraction layer is affixed to another article, wherein joining is achieved by placing the first attraction layer in joinable proximity to the second attraction layer, such that planar magnetic members of the first attraction layer and the planar magnetic members of the second attraction layer are each positioned with opposite magnetic poles facing each other, whereby sliding of the first attraction layer along the lateral axis of the second attraction layer is reduced in both the first dimension and the second dimension.

8. The system of claim 1, wherein the first attraction layer is affixed to one article and the second attraction layer is affixed to another article, wherein the planar magnetic members of the first attraction layer and the planar magnetic members of the second attraction layer are each positioned with the same magnetic poles facing each other, so that the first attraction layer and the second attraction layer repel each other.

9. The system of claim 1, wherein the articles to be joined comprise materials used in clothing or accessories.

10. The system of claim 1, wherein the first attraction layer is affixed to material used in clothing or accessories and the second attraction layer is affixed to skin or hair of a body.

11. The system of claim 1, wherein a pull force between the first attraction layer and the second attraction layer is at least one pound.

12. A magnetic array comprising a plurality of planar magnetic members, wherein:
   each planar magnetic member comprises a magnetic field having a magnetic orientation;
   each planar magnetic member is coupled to at least one other planar magnetic member in a first dimension and at least one other planar magnetic member in a second dimension;
   the magnetic orientation of each planar magnetic member is rotated about 160 degrees to about 200 degrees in relation to the magnetic orientation of each planar member to which it is coupled in the first dimension; and
   the magnetic orientation of each planar member: (i) is rotated about 160 degrees to about 200 degrees in relation to the magnetic orientation of each planar member to which it is coupled in the second dimension; or (ii) is substantially the same as the magnetic orientation of each planar magnetic member to which it is coupled in the second dimension.

13. The magnetic array of claim 12, wherein
   the magnetic orientation of each planar member is substantially the same as the magnetic orientation of each planar magnetic member to which it is coupled in the second dimension.

14. The magnetic array of claim 12, wherein
   the magnetic orientation of each planar member is rotated about 160 degrees to about 200 degrees in relation to the magnetic orientation of each planar magnetic member to which it is coupled in the second dimension.

15. The magnetic array of claim 12, wherein the coupling comprises an adhesive material, wherein said adhesive material is not a magnet-attracted material.

16. The magnetic array of claim 12, further comprising an elastomeric material in between planar magnetic members that are coupled.

17. A multi-dimensional magnetic array comprising a plurality of planar magnetic members, wherein:
   (a) each planar magnetic member comprises a magnetic field having a magnetic orientation;
   (b) each planar magnetic member is coupled to at least one other planar magnetic member in a first dimension and at least one other planar magnetic member in a second dimension; and
   (c) the magnetic orientation of each planar magnetic member is rotated about 160 degrees to about 200 degrees in relation to the magnetic orientation of each planar member to which it is coupled in the first dimension and rotated about 160 degrees to about 200 degrees in relation to the magnetic orientation of each planar member to which it is coupled in the second dimension.

18. The multi-dimensional magnetic array of claim 17, wherein the coupling comprises an adhesive material, wherein said adhesive material is not a magnet-attracted material.

19. The multi-dimensional magnetic array of claim 18, further comprising an elastomeric material in between planar magnetic members that are coupled.

20. The multi-dimensional magnetic array of claim 17, wherein the magnetic orientation of each planar magnetic member is rotated about 180 degrees in relation to the magnetic orientation of each planar member to which it is coupled in the first dimension and rotated about 180 degrees in relation to the magnetic orientation of each planar member to which it is coupled in the second dimension.

* * * * *